US011983957B2

(12) United States Patent
Shannon et al.

(10) Patent No.: US 11,983,957 B2
(45) Date of Patent: May 14, 2024

(54) IRREVERSIBLE DIGITAL FINGERPRINTS FOR PRESERVING OBJECT SECURITY

(71) Applicant: ALITHEON, INC., Bellevue, WA (US)

(72) Inventors: Will Charles Shannon, Bellevue, WA (US); Mark Tocci, Bellevue, WA (US); David Justin Ross, Bellevue, WA (US)

(73) Assignee: Alitheon, Inc., Bellevue, WA (US)

( * ) Notice: Subject to any disclaimer, the term of this patent is extended or adjusted under 35 U.S.C. 154(b) by 288 days.

(21) Appl. No.: 17/333,330

(22) Filed: May 28, 2021

(65) Prior Publication Data
US 2021/0374444 A1 Dec. 2, 2021

Related U.S. Application Data

(60) Provisional application No. 63/031,533, filed on May 28, 2020.

(51) Int. Cl.
G06K 9/62 (2022.01)
G06F 21/32 (2013.01)
(Continued)

(52) U.S. Cl.
CPC ............ *G06V 40/168* (2022.01); *G06F 21/32* (2013.01); *G06T 7/60* (2013.01); *G06T 7/73* (2017.01);
(Continued)

(58) Field of Classification Search
CPC ...... G06V 40/16–40/179; G06V 40/53; G06V 10/40–10/62
See application file for complete search history.

(56) References Cited

U.S. PATENT DOCUMENTS 4,218,674 A 8/1980 Brosow et al.
4,423,415 A 12/1983 Goldman
(Continued)

FOREIGN PATENT DOCUMENTS

DE 102006005927 A1 8/2007
EP 0439669 A2 8/1991
(Continued)

OTHER PUBLICATIONS

Mallick, "Histogram of Oriented Gradients Explained Using OpenCV", Learn OpenCV, Dec. 6, 2016, pp. 1-10. (Year: 2016).*
(Continued)

*Primary Examiner* — Brian Werner
(74) *Attorney, Agent, or Firm* — Brake Hughes Bellermann LLP

(57) ABSTRACT

Various techniques employ digital fingerprints, alone or in conjunction with other data related to a physical object, to characterize the physical object in a way allows an identity of the physical object to be confirmed or authenticated within a threshold of confidence when the physical object is encountered at a subsequently after a digital fingerprint thereof was previously ingested, without capture, retention and/or reference to certain types or categories of characterizing information which may be of a sensitive nature and/or subject to misuse or abuse. Such digital fingerprints may include feature vectors and non-positional characterization values, while advantageously omitting positional information that would otherwise allow recreation of a recognizable image of the physical object or an image from which one or more immutable characteristics or traits (e.g., physical appearance, color, race, ethnicity, gender, age) of the physical object may be discerned, and hence denominated as irreversible digital fingerprints.

29 Claims, 9 Drawing Sheets

(51) Int. Cl.
*G06T 7/60* (2017.01)
*G06T 7/73* (2017.01)
*G06V 10/44* (2022.01)
*G06V 20/80* (2022.01)
*G06V 40/10* (2022.01)
*G06V 40/16* (2022.01)
*G06V 20/00* (2022.01)
*G06V 40/50* (2022.01)

(52) U.S. Cl.
CPC ............ *G06V 10/443* (2022.01); *G06V 20/80* (2022.01); *G06V 40/10* (2022.01); *G06V 40/172* (2022.01); *G06T 2207/30201* (2013.01); *G06V 20/95* (2022.01); *G06V 40/16* (2022.01); *G06V 40/53* (2022.01)

(56) References Cited

U.S. PATENT DOCUMENTS

| | | |
|---|---|---|
| 4,677,435 A | 6/1987 | Causse et al. |
| 4,700,400 A | 10/1987 | Ross |
| 4,883,971 A | 11/1989 | Jensen |
| 4,921,107 A | 5/1990 | Hofer |
| 5,031,223 A | 7/1991 | Rosenbaum et al. |
| 5,079,714 A | 1/1992 | Manduley et al. |
| 5,393,939 A | 2/1995 | Nasuta et al. |
| 5,422,821 A | 6/1995 | Allen et al. |
| 5,514,863 A | 5/1996 | Williams |
| 5,518,122 A | 5/1996 | Tilles et al. |
| 5,521,984 A | 5/1996 | Denenberg et al. |
| 5,703,783 A | 12/1997 | Allen et al. |
| 5,719,939 A | 2/1998 | Tel |
| 5,734,568 A | 3/1998 | Borgendale et al. |
| 5,745,590 A | 4/1998 | Pollard |
| 5,883,971 A | 3/1999 | Bolle et al. |
| 5,923,848 A | 7/1999 | Goodhand et al. |
| 5,974,150 A | 10/1999 | Kaish et al. |
| 6,205,261 B1 | 3/2001 | Goldberg |
| 6,246,794 B1 | 6/2001 | Kagehiro et al. |
| 6,292,709 B1 | 9/2001 | Uhl et al. |
| 6,327,373 B1 | 12/2001 | Yura |
| 6,343,327 B2 | 1/2002 | Daniels et al. |
| 6,360,001 B1 | 3/2002 | Berger et al. |
| 6,370,259 B1 | 4/2002 | Hobson et al. |
| 6,400,805 B1 | 6/2002 | Brown et al. |
| 6,424,728 B1 | 7/2002 | Ammar |
| 6,434,601 B1 | 8/2002 | Rollins |
| 6,470,091 B2 | 10/2002 | Koga et al. |
| 6,539,098 B1 | 3/2003 | Baker et al. |
| 6,549,892 B1 | 4/2003 | Sansone |
| 6,597,809 B1 | 7/2003 | Ross et al. |
| 6,643,648 B1 | 11/2003 | Ross et al. |
| 6,697,500 B2 | 2/2004 | Woolston et al. |
| 6,741,724 B1 | 5/2004 | Bruce et al. |
| 6,768,810 B2 | 7/2004 | Emanuelsson et al. |
| 6,778,703 B1 | 8/2004 | Zlotnick |
| 6,805,926 B2 | 10/2004 | Cote et al. |
| 6,816,602 B2 | 11/2004 | Coffelt et al. |
| 6,829,369 B2 | 12/2004 | Poulin et al. |
| 6,961,466 B2 | 11/2005 | Imagawa et al. |
| 6,985,925 B2 | 1/2006 | Ogawa |
| 6,985,926 B1 | 1/2006 | Ferlauto et al. |
| 7,016,532 B2 | 3/2006 | Boncyk et al. |
| 7,031,519 B2 | 4/2006 | Elmenhurst |
| 7,096,152 B1 | 8/2006 | Ong |
| 7,120,302 B1 | 10/2006 | Billester |
| 7,121,458 B2 | 10/2006 | Avant et al. |
| 7,152,047 B1 | 12/2006 | Nagel |
| 7,171,049 B2 | 1/2007 | Snapp |
| 7,204,415 B2 | 4/2007 | Payne et al. |
| 7,212,949 B2 | 5/2007 | Bachrach |
| 7,333,987 B2 | 2/2008 | Ross et al. |
| 7,343,623 B2 | 3/2008 | Ross |
| 7,356,162 B2 | 4/2008 | Caillon |
| 7,379,603 B2 | 5/2008 | Ross et al. |
| 7,436,979 B2 | 10/2008 | Bruce et al. |
| 7,477,780 B2 | 1/2009 | Boncyk et al. |
| 7,518,080 B2 | 4/2009 | Amato |
| 7,602,938 B2 | 10/2009 | Prokoski |
| 7,674,995 B2 | 3/2010 | Desprez et al. |
| 7,676,433 B1 | 3/2010 | Ross et al. |
| 7,680,306 B2 | 3/2010 | Boutant et al. |
| 7,720,256 B2 | 5/2010 | Desprez et al. |
| 7,726,457 B2 | 6/2010 | Maier et al. |
| 7,726,548 B2 | 6/2010 | Delavergne |
| 7,748,029 B2 | 6/2010 | Ross |
| 7,822,263 B1 | 10/2010 | Prokoski |
| 7,834,289 B2 | 11/2010 | Orbke et al. |
| 7,853,792 B2 | 12/2010 | Cowburn |
| 8,022,832 B2 | 9/2011 | Vogt et al. |
| 8,032,927 B2 | 10/2011 | Ross |
| 8,108,309 B2 | 1/2012 | Tan |
| 8,180,174 B2 | 5/2012 | Di et al. |
| 8,180,667 B1 | 5/2012 | Baluja et al. |
| 8,194,938 B2 | 6/2012 | Wechsler et al. |
| 8,316,418 B2 | 11/2012 | Ross |
| 8,374,020 B2 | 2/2013 | Katti |
| 8,374,399 B1 | 2/2013 | Talwerdi |
| 8,374,920 B2 | 2/2013 | Hedges et al. |
| 8,391,583 B1 | 3/2013 | Mennie et al. |
| 8,428,772 B2 | 4/2013 | Miette et al. |
| 8,437,530 B1 | 5/2013 | Mennie et al. |
| 8,457,354 B1 | 6/2013 | Kolar et al. |
| 8,477,992 B2 | 7/2013 | Paul et al. |
| 8,520,888 B2 | 8/2013 | Spitzig et al. |
| 8,526,743 B1 | 9/2013 | Campbell et al. |
| 8,774,455 B2 | 7/2014 | Elmenhurst et al. |
| 8,959,029 B2 | 2/2015 | Jones et al. |
| 9,031,329 B1 | 5/2015 | Farid et al. |
| 9,058,543 B2 | 6/2015 | Campbell et al. |
| 9,152,862 B2 | 10/2015 | Ross et al. |
| 9,170,654 B1 | 10/2015 | Boncyk et al. |
| 9,224,196 B2 | 12/2015 | Duerksen et al. |
| 9,234,843 B2 | 1/2016 | Sopori et al. |
| 9,245,133 B1 | 1/2016 | Durst et al. |
| 9,350,552 B2 | 5/2016 | Elmenhurst et al. |
| 9,350,714 B2 | 5/2016 | Freeman et al. |
| 9,361,507 B1 | 6/2016 | Hoyos et al. |
| 9,361,596 B2 | 6/2016 | Ross et al. |
| 9,424,461 B1 | 8/2016 | Yuan et al. |
| 9,443,298 B2 | 9/2016 | Ross et al. |
| 9,558,463 B2 | 1/2017 | Ross et al. |
| 9,582,714 B2 | 2/2017 | Ross et al. |
| 9,646,206 B2 | 5/2017 | Ross et al. |
| 9,665,800 B1 | 5/2017 | Kuffner |
| 9,741,724 B2 | 8/2017 | Seshadri et al. |
| 10,037,537 B2 | 7/2018 | Withrow et al. |
| 10,043,073 B2 | 8/2018 | Ross et al. |
| 10,192,140 B2 | 1/2019 | Ross et al. |
| 10,199,886 B2 | 2/2019 | Li et al. |
| 10,346,852 B2 | 7/2019 | Ross et al. |
| 10,505,726 B1 | 12/2019 | Andon et al. |
| 10,540,664 B2 | 1/2020 | Ross et al. |
| 10,572,883 B2 | 2/2020 | Ross et al. |
| 10,621,594 B2 | 4/2020 | Land et al. |
| 2001/0010334 A1 | 8/2001 | Park et al. |
| 2001/0054031 A1 | 12/2001 | Lee et al. |
| 2002/0015515 A1 | 2/2002 | Lichtermann et al. |
| 2002/0073049 A1 | 6/2002 | Dutta |
| 2002/0134836 A1 | 9/2002 | Cash et al. |
| 2002/0168090 A1 | 11/2002 | Bruce et al. |
| 2003/0015395 A1 | 1/2003 | Hallowell et al. |
| 2003/0046103 A1 | 3/2003 | Amato et al. |
| 2003/0091724 A1 | 5/2003 | Mizoguchi |
| 2003/0120677 A1 | 6/2003 | Vernon |
| 2003/0138128 A1 | 7/2003 | Rhoads |
| 2003/0179931 A1 | 9/2003 | Sun |
| 2003/0182018 A1 | 9/2003 | Snapp |
| 2003/0208298 A1 | 11/2003 | Edmonds |
| 2003/0219145 A1 | 11/2003 | Smith |
| 2004/0027630 A1 | 2/2004 | Lizotte |
| 2004/0101174 A1 | 5/2004 | Sato et al. |
| 2004/0112962 A1 | 6/2004 | Farrall et al. |
| 2004/0218791 A1 | 11/2004 | Jiang et al. |

(56) References Cited

U.S. PATENT DOCUMENTS

| | | |
|---|---|---|
| 2004/0218801 A1 | 11/2004 | Houle et al. |
| 2004/0250085 A1 | 12/2004 | Tattan et al. |
| 2005/0007776 A1 | 1/2005 | Monk et al. |
| 2005/0038756 A1 | 2/2005 | Nagel |
| 2005/0065719 A1 | 3/2005 | Khan et al. |
| 2005/0086256 A1 | 4/2005 | Owens et al. |
| 2005/0111618 A1 | 5/2005 | Sommer et al. |
| 2005/0119786 A1 | 6/2005 | Kadaba |
| 2005/0125360 A1 | 6/2005 | Tidwell et al. |
| 2005/0131576 A1 | 6/2005 | De et al. |
| 2005/0137882 A1 | 6/2005 | Cameron et al. |
| 2005/0160271 A9 | 7/2005 | Brundage et al. |
| 2005/0169529 A1 | 8/2005 | Owechko et al. |
| 2005/0188213 A1 | 8/2005 | Xu |
| 2005/0204144 A1 | 9/2005 | Mizutani |
| 2005/0251285 A1 | 11/2005 | Boyce et al. |
| 2005/0257064 A1 | 11/2005 | Boutant et al. |
| 2005/0289061 A1 | 12/2005 | Kulakowski et al. |
| 2006/0010503 A1 | 1/2006 | Inoue et al. |
| 2006/0083414 A1 | 4/2006 | Neumann et al. |
| 2006/0109520 A1 | 5/2006 | Gossaye et al. |
| 2006/0131518 A1 | 6/2006 | Ross et al. |
| 2006/0177104 A1 | 8/2006 | Prokoski |
| 2006/0253406 A1 | 11/2006 | Caillon |
| 2007/0056041 A1 | 3/2007 | Goodman |
| 2007/0071291 A1 | 3/2007 | Yumoto et al. |
| 2007/0085710 A1 | 4/2007 | Bousquet et al. |
| 2007/0094155 A1 | 4/2007 | Dearing |
| 2007/0211651 A1 | 9/2007 | Ahmed et al. |
| 2007/0211964 A1 | 9/2007 | Agam et al. |
| 2007/0230656 A1 | 10/2007 | Lowes et al. |
| 2007/0263267 A1 | 11/2007 | Ditt |
| 2007/0269043 A1 | 11/2007 | Launay et al. |
| 2007/0282900 A1 | 12/2007 | Owens et al. |
| 2008/0008377 A1 | 1/2008 | Andel et al. |
| 2008/0011841 A1 | 1/2008 | Self et al. |
| 2008/0128496 A1 | 6/2008 | Bertranou et al. |
| 2008/0130947 A1 | 6/2008 | Ross et al. |
| 2008/0219503 A1 | 9/2008 | Di et al. |
| 2008/0250483 A1 | 10/2008 | Lee |
| 2008/0255758 A1 | 10/2008 | Graham et al. |
| 2008/0272585 A1 | 11/2008 | Conard et al. |
| 2008/0290005 A1 | 11/2008 | Bennett et al. |
| 2008/0294474 A1 | 11/2008 | Furka |
| 2009/0028379 A1 | 1/2009 | Belanger et al. |
| 2009/0057207 A1 | 3/2009 | Orbke et al. |
| 2009/0106042 A1 | 4/2009 | Maytal et al. |
| 2009/0134222 A1 | 5/2009 | Ikeda |
| 2009/0154778 A1 | 6/2009 | Lei et al. |
| 2009/0157733 A1 | 6/2009 | Kim et al. |
| 2009/0223099 A1 | 9/2009 | Versteeg |
| 2009/0232361 A1 | 9/2009 | Miller |
| 2009/0245652 A1 | 10/2009 | Bastos |
| 2009/0271029 A1 | 10/2009 | Doutre |
| 2009/0287498 A2 | 11/2009 | Choi |
| 2009/0307005 A1 | 12/2009 | Omartin et al. |
| 2010/0027834 A1 | 2/2010 | Spitzig et al. |
| 2010/0054551 A1 | 3/2010 | Decoux |
| 2010/0070527 A1 | 3/2010 | Chen |
| 2010/0104200 A1 | 4/2010 | Baras et al. |
| 2010/0157064 A1 | 6/2010 | Cheng et al. |
| 2010/0163612 A1 | 7/2010 | Caillon |
| 2010/0166303 A1 | 7/2010 | Rahimi |
| 2010/0174406 A1 | 7/2010 | Miette et al. |
| 2010/0286815 A1 | 11/2010 | Zimmermann |
| 2011/0026831 A1 | 2/2011 | Perronnin et al. |
| 2011/0064279 A1 | 3/2011 | Uno |
| 2011/0081043 A1 | 4/2011 | Sabol et al. |
| 2011/0091068 A1 | 4/2011 | Stuck et al. |
| 2011/0161117 A1 | 6/2011 | Busque et al. |
| 2011/0188709 A1 | 8/2011 | Gupta et al. |
| 2011/0194780 A1 | 8/2011 | Li et al. |
| 2011/0235920 A1 | 9/2011 | Iwamoto et al. |
| 2011/0267192 A1 | 11/2011 | Goldman et al. |
| 2012/0042171 A1 | 2/2012 | White et al. |
| 2012/0089639 A1 | 4/2012 | Wang |
| 2012/0130868 A1 | 5/2012 | Loeken |
| 2012/0177281 A1 | 7/2012 | Frew |
| 2012/0185393 A1 | 7/2012 | Atsmon et al. |
| 2012/0199651 A1 | 8/2012 | Glazer |
| 2012/0242481 A1 | 9/2012 | Gernandt et al. |
| 2012/0243797 A1 | 9/2012 | Di Venuto Dayer et al. |
| 2012/0250945 A1 | 10/2012 | Peng et al. |
| 2013/0162394 A1 | 6/2013 | Etchegoyen |
| 2013/0212027 A1 | 8/2013 | Sharma et al. |
| 2013/0214164 A1 | 8/2013 | Zhang et al. |
| 2013/0273968 A1 | 10/2013 | Rhoads et al. |
| 2013/0277425 A1 | 10/2013 | Sharma et al. |
| 2013/0284803 A1 | 10/2013 | Wood et al. |
| 2014/0032322 A1 | 1/2014 | Schwieger et al. |
| 2014/0140570 A1 | 5/2014 | Ross et al. |
| 2014/0140571 A1 | 5/2014 | Elmenhurst et al. |
| 2014/0184843 A1 | 7/2014 | Campbell et al. |
| 2014/0201094 A1 | 7/2014 | Herrington et al. |
| 2014/0270341 A1 | 9/2014 | Elmenhurst et al. |
| 2014/0314283 A1 | 10/2014 | Harding |
| 2014/0380446 A1 | 12/2014 | Niu et al. |
| 2015/0058142 A1 | 2/2015 | Lenahan et al. |
| 2015/0067346 A1 | 3/2015 | Ross et al. |
| 2015/0078629 A1 | 3/2015 | Gottemukkula et al. |
| 2015/0086068 A1 | 3/2015 | Mulhearn et al. |
| 2015/0117701 A1 | 4/2015 | Ross et al. |
| 2015/0127430 A1 | 5/2015 | Hammer |
| 2015/0131868 A1* | 5/2015 | Rooyakkers ........ G06F 16/5866 382/110 |
| 2015/0248587 A1 | 9/2015 | Oami et al. |
| 2015/0294189 A1 | 10/2015 | Benhimane et al. |
| 2015/0309502 A1 | 10/2015 | Breitgand et al. |
| 2015/0371087 A1 | 12/2015 | Ross et al. |
| 2016/0034914 A1 | 2/2016 | Gonen et al. |
| 2016/0055651 A1 | 2/2016 | Oami |
| 2016/0057138 A1 | 2/2016 | Hoyos et al. |
| 2016/0117631 A1 | 4/2016 | McCloskey et al. |
| 2016/0162734 A1 | 6/2016 | Ross et al. |
| 2016/0180546 A1 | 6/2016 | Kim et al. |
| 2016/0189510 A1 | 6/2016 | Hutz |
| 2016/0203387 A1 | 7/2016 | Lee et al. |
| 2016/0300234 A1 | 10/2016 | Moss-Pultz et al. |
| 2016/0335520 A1 | 11/2016 | Ross et al. |
| 2017/0004444 A1 | 1/2017 | Krasko et al. |
| 2017/0032285 A1 | 2/2017 | Sharma et al. |
| 2017/0132458 A1 | 5/2017 | Short et al. |
| 2017/0153069 A1 | 6/2017 | Huang et al. |
| 2017/0243230 A1 | 8/2017 | Ross et al. |
| 2017/0243231 A1 | 8/2017 | Withrow et al. |
| 2017/0243232 A1 | 8/2017 | Ross et al. |
| 2017/0243233 A1 | 8/2017 | Land et al. |
| 2017/0249491 A1 | 8/2017 | Macintosh et al. |
| 2017/0251143 A1 | 8/2017 | Peruch et al. |
| 2017/0253069 A1 | 9/2017 | Kerkar et al. |
| 2017/0295301 A1 | 10/2017 | Liu et al. |
| 2017/0300905 A1 | 10/2017 | Withrow et al. |
| 2017/0344823 A1 | 11/2017 | Withrow et al. |
| 2017/0344824 A1 | 11/2017 | Martin |
| 2017/0372327 A1 | 12/2017 | Withrow |
| 2018/0005019 A1* | 1/2018 | Chattopadhyay ...... G06V 10/56 |
| 2018/0012008 A1 | 1/2018 | Withrow et al. |
| 2018/0018627 A1 | 1/2018 | Ross et al. |
| 2018/0018838 A1 | 1/2018 | Fankhauser et al. |
| 2018/0024074 A1 | 1/2018 | Ranieri et al. |
| 2018/0024178 A1 | 1/2018 | House et al. |
| 2018/0047128 A1 | 2/2018 | Ross et al. |
| 2018/0053312 A1 | 2/2018 | Ross et al. |
| 2018/0121643 A1 | 5/2018 | Talwerdi et al. |
| 2018/0144211 A1 | 5/2018 | Ross et al. |
| 2018/0315058 A1 | 11/2018 | Withrow et al. |
| 2018/0349694 A1 | 12/2018 | Ross et al. |
| 2019/0026581 A1 | 1/2019 | Leizerson |
| 2019/0034518 A1 | 1/2019 | Liu et al. |
| 2019/0034694 A1 | 1/2019 | Ross |
| 2019/0102873 A1 | 4/2019 | Wang et al. |
| 2019/0102973 A1 | 4/2019 | Oyama et al. |
| 2019/0130082 A1 | 5/2019 | Alameh et al. |
| 2019/0228174 A1 | 7/2019 | Withrow et al. |

(56) References Cited

U.S. PATENT DOCUMENTS

| | | |
|---|---|---|
| 2019/0287118 A1 | 9/2019 | Ross et al. |
| 2019/0342102 A1 | 11/2019 | Hao et al. |
| 2020/0153822 A1 | 5/2020 | Land et al. |
| 2020/0226366 A1 | 7/2020 | Withrow et al. |
| 2020/0233901 A1 | 7/2020 | Crowley et al. |
| 2020/0250395 A1 | 8/2020 | Ross et al. |
| 2020/0257791 A1 | 8/2020 | Shannon et al. |
| 2020/0334689 A1 | 10/2020 | Withrow |
| 2020/0349379 A1 | 11/2020 | Ross |
| 2020/0356772 A1 | 11/2020 | Withrow et al. |

FOREIGN PATENT DOCUMENTS

| | | |
|---|---|---|
| EP | 0759596 A2 | 2/1997 |
| EP | 1016548 A2 | 7/2000 |
| EP | 1016549 A1 | 7/2000 |
| EP | 1719070 B1 | 4/2009 |
| EP | 2107506 A1 | 10/2009 |
| EP | 2166493 A1 | 3/2010 |
| EP | 2195621 B1 | 11/2013 |
| EP | 2866193 A1 | 4/2015 |
| EP | 2257909 B1 | 5/2015 |
| EP | 2869240 A2 | 5/2015 |
| EP | 2869241 A2 | 5/2015 |
| EP | 3208744 A1 | 8/2017 |
| EP | 3249581 A1 | 11/2017 |
| EP | 3270342 A1 | 1/2018 |
| EP | 3435287 A2 | 1/2019 |
| EP | 3514715 A1 | 7/2019 |
| GB | 2097979 A | 11/1982 |
| GB | 2482127 A | 1/2012 |
| JP | 61234481 A | 10/1986 |
| JP | H07192112 | 7/1995 |
| JP | 2007213148 A | 8/2007 |
| KR | 20120009654 A | 2/2012 |
| WO | 2005086616 A2 | 9/2005 |
| WO | 2006038114 A1 | 4/2006 |
| WO | 2007028799 A1 | 3/2007 |
| WO | 2007031176 A1 | 3/2007 |
| WO | 2007071788 A1 | 6/2007 |
| WO | 2007090437 A1 | 8/2007 |
| WO | 2007144598 A1 | 12/2007 |
| WO | 2009030853 A1 | 3/2009 |
| WO | 2009089126 A1 | 7/2009 |
| WO | 2009115611 A2 | 9/2009 |
| WO | 2010018464 A2 | 2/2010 |
| WO | 2010018646 A1 | 2/2010 |
| WO | 2012145842 A1 | 11/2012 |
| WO | 2013051019 A1 | 4/2013 |
| WO | 2013126221 A1 | 8/2013 |
| WO | 2013173408 A1 | 11/2013 |
| WO | 2015004434 A1 | 1/2015 |
| WO | 2016081831 A1 | 5/2016 |

OTHER PUBLICATIONS

Anonymous, "Intrinsic Characteristics for Authentication" & "Alp Vision Advances Security Through Digital Technology," Authentication News vol. 12, (No. 9) pp. 2, 7 and 8, dated Sep. 2006, 3 pages total.
Bao et al., "Local Feature based Multiple Object Instance Identification using Scale and Rotation Invariant Implicit Shape Model," 12th Asian Conference on Computer Vision, Singapore, Singapore, Nov. 1-5, 2014, pp. 600-614.
Beekhof et al., "Secure Surface Identification Codes," Proceeding of the SPIE 6819: Security Forensics, Steganography, and Watermarking of Multimedia Contents X:68190D, 2008. (12 pages).
Buchanan et al., "Fingerprinting documents and packaging," Nature 436 (7050): 475, 2005.
Cavoukian et al. "Biometric Encryption: Technology for Strong Authentication, Security and Privacy," 2008, WE, Intl. Fed. Iot Info Processing, vol. 261; Policies and Research in Identity Management; pp. 57-77.
Di Paola et al., "An Autonomous Mobile Robotic System for Surveillance of Indoor Environments," International Journal of Advanced Robotic Systems 7(1): 19-26, 2010.
Drew, M. S., et al., "Sharpening from Shadows: Sensor Transforms for Removing Shadows using a Single Image," Color and Imaging Conference, vol. 5, Society for Imaging Science and Technology, 2009, pp. 267-271.
Ebay, "eBay Launches Must-Have !Phone App Red Laser 3.0" published Nov. 18, 2011; https://www.ebayinc.com/stories/news/ebay-launches-must-have-iphone-app-redlaser-30/, downloaded Mar. 21, 2019, 7 pages).
Entropy.com Website History, Wayback Machine; https://web.archive.org/web/20160330060808/https://www.entrupy.com/; Mar. 30, 2016 (Year: 2016), 2 pages.
Extended European Search Report Application No. 21153877.2, dated Jun. 15, 2021, 8 pages.
Extended European Search Report, dated Jun. 18, 2021, for European Application No. 21153355.9, 8 pages.
Farid, "Digital Image Forensics", Dartmouth CS 89/189, Sprint 2013; 199 pages.
Fischler et al., "Random Sample Consensus: A Paradigm for Model Fitting with Applications to Image Analysis and Automated Cartography," Communication of the ACM 24(6); 381-395, 1981.
Huang et al., "A Novel Binarization Algorithm for Ballistic Imaging Systems," 3rd International Congress on Image and Signal Processing, Yantai, China, Oct. 16-18, 2010, pp. 1287-1291.
Huang, et al., "An Online Ballistics Imaging System for Firearm Identification"; 2nd International Conference on Signal Processing Systems, Dalian, China, Jul. 5-7, 2010, vol. 2, pp. 68-72.
Kartik et al., "Security System with Face Recognition, SMS Alert and Embedded Network Video Monitoring Terminal," International Journal of Security, Privacy and Trust Management 2(5):9-19, 2013.
Li, "Image Processing for the Positive Identification of Forensic Ballistics Specimens," Proceedings of the 6th International Conference of Information Fusion, Cairns, Australia, Jul. 8-11, 2003, pp. 1494-1498.
Li, "Firearm Identification System Based on Ballistics Image Processing," Congress on Image and Signal Processing, School of Computer and Information Science, Faculty of Computing, Health and Science Edith Cowan University, Perth, Australia pp. 149-154.
Maddern et al., "Illumination Invariant Imaging: Applications in Robust Vision-based Localization, Mapping and Classification for Autonomous Vehicles," IEEE International Conference on Robotics and Automation, Hong Kong, May 31-Jun. 7, 2014, 8 pages.
Matsumoto et al., "Nano-artifact metrics based on random collapse of resist," Scientific Reports 4:6142, 2014 (5 pages).
Mistry et al., "Comparison of Feature Detection and Matching Approaches: SIFT and SURF," Global Research and Development Journal for Engineering, vol. 2, Issue 4, Mar. 2017, 8 pages.
Online NCOALink® Processing Acknowledgement Form (PAF) Released by Lorton Data, Jun. 2, 2009, URL=http://us.generation-nt.com/online-ncoalink-processingacknowledgement-form-paf-released-by-press-1567191.html, download date Jun. 25, 2010, 2 pages.
Rublee et al., "ORB: an efficient alternative to Sift or Surf," IEEE International Conference on Computer Vision, Barcelona, Spain, Nov. 6-13, 2011, 8 pages.
Schneider et al., "A Robust Content Based Digital Signature for Image Authentication," Proceeding of the International Conference on Image Processing Lausanne, Switzerland, Sep. 19, 1996, pp. 227-230.
Schwabe Williamson & Wyatt, PC—Listing of Related Cases; dated Sep. 16, 2017; 2 pages.
Sharma et al., "The Fake vs Real Goods Problem: Microscopy and Machine Learning to the Rescue," KDD 2017 Applied Data Science Paper, Aug. 13-17, 2017, Halifax, NS, Canada, 9 pages.
Shi et al., "Smart Cameras: Fundamentals and Classification," Chapter 2, Belbachir (ed.), Smart Cameras, Springer, New York, New York, USA 2010, pp. 19-34.

(56) References Cited

OTHER PUBLICATIONS

Shields, "How To Shop Savvy With Red Laser," published online on Mar. 22, 2010; https ://i phone .appstomn .net/ reviews/lifestyle/how-to-shop-savvy-with-redlaser /, downloaded Mar. 22, 2010, 8 pages).

Smith, "Fireball: A Forensic Ballistic Imaging System: Proceedings of the 31st Annual International Carnahan Conference on Security Technology," Canberra, Australia, Oct. 15-17, 1997, pp. 64-70.

Takahashi et al., "Mass-produced Parts Traceability System Based on Automated Scanning of Fingerprint of Things," 15th IAPR International Conference on Machine Vision Applications, Nagoya, Japan, May 8-12, 2017, 5 pages.

United States Postal Service, "NCOALink Systems", http://www.usps.com/ncsc/addressservices/moveupdate/changeaddress.htm, website accessed Jun. 23, 2010, 2 pages.

United States Postal Service, "Postal Addressing Standards," Publication Jul. 28, 2008, 55 pages.

United States Postal Services, NCOALink® Systems, dated May 27, 2009, URL=http://ribbs.usps.gov/ncoalink/ncoalink_print.htm, download date Jun. 23, 2010, 3 pages.

Veena et al., "Automatic Theft Security System (Smart Surveillance Camera)," Computer Science & Information Technology 3:75-87, 2013.

Woods, "Counterfeit-spotting truth machine launches out of Dumbo," published online on Feb. 11, 2016, downloaded from http://technically/brooklyn/2016/02/11/entrupy-counterfeit-scanner/ on Mar. 20, 2019, 3 pages.

Farid, Ahmed , et al., "Integrated fingerprint verification method using a composite signature-based watermarking technique", Optical Engineering, The Catholic University of America, (Year: 2007), 6 pages.

Jain, Anil K, et al., "Biometric Cryptosystems: Issues and Challenges", Proceedings of the IEEE, IEEE, New York, US, vol. 92, No. 6, Jun. 1, 2004, XP011112757, pp. 948-960.

Truong, Hieu C, et al., "Royal Canadian Mint/Signoptic Technologies Coin DNA Technology", World Money Fair (WMF) Berlin Feb. 1-3, 2011, http://www.amisdeleuro.org/upload/1340734488.pptx, 22 pages.

Zaeri, Naser , "Minutiae-based Fingerprint Extraction and Recognition, 2020 (year 2010)", 47 pages.

* cited by examiner

IRREVERSIBLE DIGITAL FINGERPRINTS FOR PRESERVING OBJECT SECURITY

CROSS REFERENCE TO RELATED APPLICATIONS

This patent application claims benefit of U.S. provisional patent application 63/031,533, the entirety of which is incorporated herein by reference.

COPYRIGHT NOTICE

COPYRIGHT©2020-2021 Alitheon, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d) (2017).

BACKGROUND

Technical Field

The present disclosure pertains to systems, methods, and apparatus associated with digital fingerprints generated in a manner that avoids collection and/or retention of digital fingerprint information of a type that a system operator wishes to avoid collecting and/or retaining.

Description of the Related Art

Many different approaches have been tried to uniquely identify and authenticate objects, including labelling and tagging strategies using serial numbers, bar code symbols, holographic labels, radio frequency identification (RFID) transponders or tags, and hidden patterns using security inks or special fibers. All of these methods can be duplicated, and many add a substantial extra cost to the production of the goods sought to be protected. Moreover, physical labels and tags may be lost, modified, or stolen, and the physical marking of certain objects such as artwork, gemstones, and collector-grade coins may damage or destroy the value of the object.

A need remains for solutions that enable an efficient and accurate determination of a physical object's (or a living being's) identity without relying on the addition of some otherwise unnecessary attribute to the object (or living being) while simultaneously avoiding the capture and/or retention of certain types and categories of information regarding the object (or living being) which may be of a sensitive nature, or subject to misuse or abuse.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

The following is a summary of the present disclosure in order to provide a basic understanding of some features and context. This summary is not intended to identify key/critical elements of the present disclosure or to delineate the scope of the disclosure. Its sole purpose is to present some concepts of the present disclosure in a simplified form as a prelude to the more detailed description that is presented later.

In a preferred embodiment, the devices, methods, and systems of this disclosure (i.e., the teachings of this disclosure) enable a user to use a digital fingerprint, alone or in conjunction with other data concerning or related to a physical object, to characterize the physical object in a way that the identity of the physical object may be confirmed within a threshold of confidence when the physical object is imaged or scanned for identification at a subsequent time, without capture, retention and/or reference to certain types or categories of characterizing information regarding the physical object which may be of a sensitive nature and/or subject to misuse or abuse.

The teachings of the present disclosure have in view any system or method where a physical object or living being are identified by a digital fingerprint within a threshold of confidence in which the system or method avoids capture and/or does not retain certain undesirable or sensitive information in relation to an object, including, as one example among many, the demographic characteristics of a person.

BRIEF DESCRIPTION OF THE DRAWINGS

To enable the reader to realize one or more of the above-recited and other advantages and features of the present disclosure, a more particular description follows by reference to specific embodiments thereof which are illustrated in the appended drawings. Understanding that these drawings depict only typical embodiments of the disclosure and are not therefore to be considered limiting of its scope, the present disclosure will be described and explained with additional specificity and detail through the use of the accompanying drawings.

DETAILED DESCRIPTION

Figure 1:
FIG. 1 is a set of images showing normalized examples from the Carnegie Mellon PIE face database.

The device, method, and system embodiments described in this disclosure (i.e., the teachings of this disclosure) enable a user to generate or otherwise acquire at least one digital fingerprint of an object with confidence that the exact same object can be later identified to an acceptable level of certainty, without retention of, or reference to, certain types and/or classes of characterizing information which the user may, due to the nature of the certain characterizing information, wish to avoid capture or retention of.

The term "digital fingerprint" in all its grammatical forms and constructs, is used throughout the present specification and claims to refer to a computationally unique digital identifier of a physical object or a portion of a physical object. Each and every digital fingerprint identifying a determined portion of a physical object is computationally different (within the limitations of current resources) from each and every other digital fingerprint identifying a different physical object or identifying a different portion of the same physical object. Additionally, to preserve the determined portion of the physical object on which a first digital fingerprint is generated, each and every subsequent digital fingerprint identifying the same determined portion of the same physical object is statistically and computationally the same (within the limitations of current resources) as the first digital fingerprint. In at least some cases, a digital fingerprint, as the term is used herein, is generated in a method that includes acquiring a digital image, finding points of interest within that digital image (e.g., generally, regions of disparity where "something" is happening, such as a white dot on a black background or the inverse), and characterizing those points of interest into one or more feature vectors extracted from the digital image. Characterizing the points of interest may include assigning image values, assigning or otherwise determining a plurality of gradients across the image region, or performing some other technique. The extracted feature vectors may or may not be analyzed or further processed. Instead, or in addition, the extracted feature vectors that characterize the points of interest in a region may be aggregated, alone or with other information (e.g., with location information) to form a digital fingerprint.

In embodiments of the present disclosure, digital fingerprinting includes the creation and use of digital fingerprints derived from properties of a physical object (including living beings). The digital fingerprints are typically stored in a repository such as a register, a physical memory, an array, a database, data store, or some other repository. Storing the digital fingerprint in the repository may include, or in some cases be referred to as, inducting the respective physical object into the repository. Digital fingerprints, whether immediately generated or acquired from a repository, may be used to reliably and unambiguously identify or authenticate corresponding physical objects to an acceptable level of certainty, track the physical objects through supply chains, and record their provenance and changes over time. Many other uses of digital fingerprints are of course contemplated.

Digital fingerprints store information, preferably in the form of numbers or "feature vectors," that describes features that appear at particular locations, called points of interest, of a two-dimensional (2-D) or three-dimensional (3-D) object. In the case of a 2-D object, the points of interest are preferably on a surface of the corresponding object; in the 3-D case, the points of interest may be on the surface or in the interior of the object. In some applications, an object "feature template" may be used to define locations or regions of interest for a class of objects. The digital fingerprints may be derived or generated from digital data of the physical object which may be, for example, image data.

While the data from which digital fingerprints are derived is often images, a digital fingerprint may contain digital representations of any data derived from or associated with the object. For example, digital fingerprint data may be derived from an audio file. That audio file in turn may be associated or linked in a repository (e.g., a database, data store, memory, or the like) to an object. Thus, in general, a digital fingerprint may be derived from a first object directly, or it may be derived from a different object (e.g., a file) linked to the first object, or a combination of two or more sources. In the audio example, the audio file may be a recording of a person speaking a particular phrase. The digital fingerprint of the audio recording may be stored as part of a digital fingerprint of the person speaking. The digital fingerprint (e.g., the digital fingerprint of the person) may be used as part of a system and method to later identify or authenticate that person, based on their speaking the same phrase, in combination with other sources.

Returning to the 2-D and 3-D object examples discussed herein, feature extraction or feature detection may be used to characterize points of interest. In an embodiment, this may be done in various ways. Two examples include Scale-Invariant Feature Transform (or SIFT) and Speeded Up Robust features (or SURF). Both are described in the literature. For example: "Feature detection and matching are used in image registration, object tracking, object retrieval etc. There are number of approaches used to detect and matching of features as SIFT (Scale Invariant Feature Transform), SURF (Speeded up Robust Feature), FAST, ORB, etc. SIFT and SURF are most useful approaches to detect and matching of features because of it is invariant to scale, rotate, translation, illumination, and blur." MISTRY, Darshana et al., *Comparison of Feature Detection and Matching Approaches: SIFT and SURF*, GRD Journals-Global Research and Development Journal for Engineering|Volume 2|Issue 4|March 2017.

In an embodiment, features may be used to represent information derived from a digital image in a machine-readable and useful way. Features may comprise point, line, edges, blob of an image, etc. There are areas such as image registration, object tracking, and object retrieval, etc., that require a system or processor to detect and match correct features. Therefore, it may be desirable to find features in ways that are invariant to rotation, scale, translation, illumination, and/or noisy and blurred images. The search of interest points from one object image to corresponding images can be very challenging work. The search may preferably be done such that the same physical interest points may be found in different views. Once located, points of interest and their respective characteristics may be aggregated to form a digital fingerprint, which may include 2-D or 3-D location parameters.

In an embodiment, features may be matched, for example, based on finding a minimum threshold distance. Distances can be found using Euclidean distance, Manhattan distance, or other suitable metrics. If distances of two points are less than a prescribed minimum threshold distance, those key points may be known as matching pairs. Matching a digital fingerprint may comprise assessing a number of matching pairs, their locations, distance, or other characteristics. Many points may be assessed to calculate a likelihood of a match, since, generally, or at least in some cases, a perfect match will not be found. In these cases where a perfect match is not found, a match may still be asserted when the features are matched to within a predetermined similarity threshold or some other acceptable level of confidence. In some applications a "feature template" may be used to define locations or regions of interest for a class of physical objects.

The term, "induction," as used in the present disclosure, refers to acts that include generating and storing, or otherwise acquiring access to, at least one digital fingerprint of a physical object, and storing the one or more digital fingerprints in a repository. Each stored digital fingerprint may be communicatively linked (i.e., associated) with other information related to the physical object. Hence, induction may also include acts that store additional information related to the physical object in a same or different repository. The additional information may be stored in association with any number of digital fingerprints. The association may include storing associated data in a common or shared repository record, communicatively linking one or more repository records together, or via other techniques known in the art to link information. For the sake of illustration and not limitation, induction may include storing one or more digital fingerprints in a new or existing repository record and further storing some other type of information, whether related to one or both of the physical object and the digital fingerprint, in a same or linked repository record.

Scanning

In the present disclosure, the term, "scan," in all of its grammatical forms, refers illustratively and without limitation to any and all means for capturing scan data, including an image or set of images, which may be in digital form or transformed into digital form. Images may, for example, be two dimensional (2-D), three dimensional (3D), or in the form of video. Thus, a scan may refer to a collection of scan data, including one or more images, or digital data that defines such an image or images, captured by a scanner, a camera, an imager, a 3D-sense device, a LiDAR-based device, a laser-based device, a specially adapted sensor or sensor array (e.g., a CCD array), a microscope, a smartphone camera, a video camera, an x-ray machine, a sonar, an ultrasound machine, a microphone (i.e., any instrument for converting sound waves into electrical energy variations), and the like. Broadly, any device that can sense and capture either electromagnetic radiation or a mechanical wave that has traveled through an object or reflected off an object, or any other means to capture surface or internal structure of an object, is a candidate to create a scan of an object. Various means to extract features from an object may be used. For example, features may be extracted through sound, physical structure, chemical composition, or many other means. Accordingly, while the term, images, and cognates of the term, images, are used to form the digital fingerprints described herein, the broader application of scanning technology will be understood by those of skill in the art. In other words, alternative structures, methods and/or techniques to extract features from an object and to generate a digital fingerprint that uniquely identifies the object should be considered equivalents within the scope of this disclosure. Along these lines, terms such as "scanner," "scanning equipment," "sensor," "sensor array," and the like as used herein may be understood in a broad sense to refer to any equipment capable of carrying out scans as described above, or to equipment that carries out scans as described above, as part of their function to produce sensor data (e.g., scan data, image data, x-ray data, acoustic data, ultrasound data, audio data, or the like).

Authentication

In this application, different forms of the words "authenticate" and "authentication" will be used broadly to describe both authentication and attempts to authenticate, which comprise creating a digital fingerprint of the object. Therefore, "authentication" is not limited to specifically describing successful matching of inducted objects or generally describing the outcome of attempted authentications. As one example, a counterfeit object may be described as "authenticated" even if the "authentication" fails to return a matching result. In another example, in cases where unknown objects are "authenticated" without resulting in a match and the authentication attempt is entered into a repository (e.g., a database, a data store, or the like) for subsequent reference, this action too may be described as "authentication" or "attempted authentication," and this action may also, post facto, be properly described as an induction. An authentication of an object may refer to the induction or authentication of an entire object or of a portion of an object. In this application, "identification" and its various forms may be used to convey the same meaning as "authentication."

Irreversible Digital Fingerprints for Preserving Object Security

The present disclosure discloses methods to remove and/or avoid capturing certain characterizing information in digital fingerprints, including, in a preferred embodiment, the disclosure of methods to remove and/or avoid capture of characterizing information that could be used for profiling or other undesirable purposes. This disclosure will frequently use facial biometrics as an example, however, this example is not limiting in scope and the teachings of this disclosure are applicable to any form of digital authentication for which it is desirable to avoid inadvertent retention of information that might lead to identification or characterization of an object in ways that are undesirable or not intended by system operators.

The teachings of this disclosure enable the production of digital fingerprints that are effective for matching against other digital fingerprints and that, in a preferred embodiment, contain only the information intentionally associated with a matched reference's digital fingerprint.

In one embodiment, the taught technology enables the creation of a digital fingerprint of a test object. The test object digital fingerprint may be compared with a reference database of previously created digital fingerprints and, if the same object is in the reference database, a match may be indicated with a high degree of confidence, while ensuring that the digital fingerprints (both reference and test) of the object contain no undesirable additional information about the object. In one embodiment, the matching result will only make known the information intentionally associated with the reference digital fingerprint in the reference database.

In a preferred embodiment, the present disclosure teaches how to avoid the capture or storage in a digital fingerprint (or remove if captured or stored) types of identifying or characterizing information that could be used to determine anything about the object beyond that it matches a particular reference digital fingerprint. Several methods and approaches are possible, but this disclosure concentrates, by way of example and without limitation, on methods for ensuring that information concerning certain potential classes to which the object belongs (class-based information) is not captured or stored and cannot be discerned either algorithmically or by human inspection.

It may be desirable to exclude class-based information for at least two reasons. One reason would be to avoid the situation where a party in possession of a digital fingerprint is able to identify the individual to whom the digital fingerprint belongs without access to a reference database containing such information. A second reason would be to exclude any information that may reveal the individual's demographic characteristics, such as age, gender, race, and ethnicity. Information that distinguishes one object or individual from another is, of course, needed to identify an individual or object (through the digital fingerprint). However, in a preferred embodiment, information regarding an individual's age, gender, race, or ethnicity is not necessary to enable a matching of the digital fingerprint of a particular individual to his particular reference digital fingerprint. This is true even if some hierarchical classification systems need such information to function properly.

There are several ways in which superfluous, undesirable, and/or potentially harmful information may be included in digital fingerprints. In some cases, the preservation of information within the digital fingerprint localizes characteristics of the image and thereby allows at least an imperfect reconstruction of the image. The inclusion of this information in the digital fingerprint is problematic because people tend to have the ability to determine characteristics of other peoples' faces based on very limited information. One portion of the teachings of the present disclosure involves, in one embodiment, ensuring that a digital fingerprint cannot be used to recover such information.

Most methods for matching an object's digital fingerprints involve finding points or regions on the object and characterizing them in ways that distinguish them from other regions in the same or different digital fingerprint. SIFT and SURF, for example, are well-known methods for characterizing repeatable points located on an image and using characteristics of the image as features. Such a system is used as an example later in this disclosure.

One reason for the preservation of class-based information that could reveal one or more of the individual's age, gender, race, or ethnicity stems from a concept called the "Soreff Criterion", which states that the information needed to identify an object will always be sufficient to at least partially reconstruct the object's image. Most currently existing methods that avoid this revelation are usually applicable to only a limited problem. In the general case, the Soreff Criterion is difficult to get around. Positional and image-characterizing information is a common source for preserving unwanted class-based information. If the image can even be partially reproduced a person viewing the partial image can often tell a great deal about the person or object in the image. The present disclosure teaches, in at least one embodiment, the removal of this source of unwanted class-based information while maintaining the ability to successfully match test objects and people to references in the database.

Class-based vs. item-based recognition. There are distinctions between class-based and item-based object recognition. Class-based recognition seeks to determine generally what kind or category of object is presented, such as of the category "cat". Such systems, for example, often speak of the "classification" of the object (that is, to what class of objects does it belong). Conversely, item-based recognition seeks to determine specifically which object or individual is presented, for example determining whether an item that appears in a subsequent image capture is the same item that appeared in an earlier image capture. In which manner a particular cat is then identified depends on the system. If the system is an individual item-based system, determining that the object is categorically a cat starts by determining if it matches a digital fingerprint in the database associated with the description "Freddy the cat". It is only by first recognizing "Freddy" that the category of "a cat" is recognized since the database reference says that "Freddy" is a "cat". In other words, an item-based system is bottom up.

A class-based system, on the other hand, is top-down: it may identify an object as a member of the class "cat", then as a member of the sub-class "tabby cat", and finally as a member of a class with one member: "Freddy". Class membership is intrinsic in this hierarchical approach to identification and recognition. In a system for human identification, if a person's age, gender, race, or ethnicity are a factor in such a hierarchical system, the system is intrinsically and unavoidably open to potential misuse or abuse. Most existing biometric recognition and authentication systems suffer from this issue because knowledge of class membership is inherent in the functioning of the system. This issue of inherent demographic classes being associated with the identity of individuals is one reason for reticence among some to use biometrics for identification.

Not all identification systems, or biometric systems, suffer from this intrinsic problem. Systems such as those used by Alitheon, Inc. that identify individual objects directly, using features intrinsic to the natural structure of the object itself, have no need for class-based information. Removing class-based information that a human or an algorithm could use to determine one or more of age, gender, race, and ethnicity is a complex matter. When classification based on such demographic characterizations is an inherent part of the matching process, it is impossible. This disclosure teaches ways to exclude the extraneous class-based information from the digital fingerprint when the digital fingerprint is used in an individual item-based system.

This disclosure does not teach removal of class-based information from class-based identification systems. Rather, this disclosure teaches, among other things, methods to avoid the inadvertent capture of various types of class-based information that, for example, could be abused for profiling or other undesirable uses.

Digital Fingerprinting

Digital fingerprints are used to identify an object or a scene that has previously been encountered when it is encountered again. A digital fingerprint includes features that characterize the object in such a way that the characterization obtained later under different capture conditions (e.g., differences in lighting, angle of view, distance) will be close enough to the original acquisition to allow confident matching. Comparing a digital fingerprint created from a later acquisition with a reference set of digital fingerprints previously created and labeled enables the identification of current objects and scenes with those previously seen.

While it is generally desirable that digital fingerprints be as small as possible (to minimize storage requirements and processing time), under most circumstances it is unimportant whether the digital fingerprint contains excess information that is not used in directly identifying the object. The consequence of incorporating excess information depends strongly on the application. Some types of excess data may be useful, such as, for example, metadata specifying how and where the acquisition is made. Discussion of such excess information that is intentionally captured is outside the scope of this disclosure. Some of it, such as point of interest characterizations obtained from the background instead of from the object, may slow down processing or increase storage requirements. However, in a well-designed digital fingerprint system these effects are generally of little consequence. To speed up processing or reduce storage requirements, it may be desirable to keep such extraneous characterizations out of the digital fingerprint, but in general such extra characterized regions or points cannot be misused.

Finally, there is information that may or may not be acquired intentionally that has the potential to be misused or abused. This information may be acquired for a number of reasons, for example because the information increases process accuracy or makes a hierarchical recognition system possible. The teachings of the present disclosure minimize such undesirable effects while avoiding significant fall-off in performance. While it may be desirable to exclude any and all extraneous information that is not essential for recognition or authentication, the primary focus of this disclosure is on the exclusion of undesirable class-based information, such as information that violates privacy or that may otherwise be a target for misuse and abuse. Preferably, the removal of such information should not degrade the performance of the recognition and authentication system. Many existing systems—such as hierarchical recognition of a person as first a human, then as a certain ethnicity, then as a male, and so on—cannot function if certain demographic characteristics information is removed as the functioning of hierarchical recognition depends on the inclusion of that information. Hierarchical recognition systems that reference demographic characteristics are not suitable for use in cases where users wish to avoid the possibility of, for example, racial or ethnic or age-based profiling.

There exist biometric facial recognition and authentication systems that can be configured to function well without reference to any type of demographic characteristics information. One such system is Alitheon's patented Feature-Print™ digital fingerprinting system. This disclosure assumes the use of such a system where class-based information is not a required part of its functioning, and hence the structures, methods and/or techniques described herein can be employed to advantageously omit demographic characteristic information from digital fingerprints while still maintaining computational efficiency at suitable levels.

Even in a well-designed digital fingerprinting system, to avoid profiling and other abuses, it may be necessary to accept some degradation in performance resulting from the exclusion of information. This is acceptable, provided the digital fingerprinting system still performs well. This will typically only be possible where the excluded information is not necessary for the system to function. One example of such superfluous information and where it arises will be given in the following section.

Throughout this disclosure, terms such as "images", "positions", and "locations" are used, as well as examples such as "faces". It should be understood, however, that any form of data capture appropriate for digital fingerprinting is included in the term "image" and that any object features that can be localized even approximately to their origin on the object are included in the term "position" or "location".

Existing Methods of Facial Biometrics

There are many well-known approaches to using facial biometrics for recognition. Two of the most common approaches to using facial biometrics to identify individuals are eigenfaces and point of interest-based image descriptors. There are many others, but these two demonstrate the problems inherent in even systems that have no need of preserving class-based information in their feature vectors.

Eigenfaces was developed by Sirovich and Kirby in 1987 and is generally considered to have been the first workable digital facial recognition system. It takes a set of normalized images of faces and from that set seeks to capture average behavior within that set and the maximum variations from that average. The approach uses a normalized form of the entire image and does not seek to isolate particular features from the image; instead, it normalizes the faces to have a standard resolution and to be framed in the image similarly. The distribution of such images is then analyzed to find the principle components of the distribution of the faces. If there are N pixels in each image, the individual images may be seen as vectors of length N. The distribution is analyzed by finding the average value for each feature, subtracting that from each image, and then the eigenvectors of the covariance matrix of the resulting distribution are found. These vectors are then ranked in decreasing order by their associated eigenvalues and the top k such vectors chosen for processing the reference set. These references are called "eigenfaces" and there are generally far fewer of them than there are reference images.

The dot product of the reference images is then taken with these k eigenfaces and the resulting k-long vector becomes the characterizing vector for those reference images. Since k is typically much smaller than N, substantial storage space and analysis time is saved and generalization is greatly improved.

When recognition is run, the test face is normalized the same way, the average of the reference distribution subtracted, and the dot product of the resulting vector taken with the k eigenfaces. The resulting k-long vector becomes the characterizing vector that is then compared against the reference feature vectors and the best match selected.

FIG. 1 shows normalized examples from the Carnegie Mellon PIE face database.

Figure 2:
FIG. 2 is a set of images showing the results of processing the normalized examples from the Carnegie Mellon PIE face database of FIG. 1.

These are processed as discussed above, the results of the processing illustrated in FIG. 2. In FIG. 2, the top left image is the average of all the faces in the database. The remaining images show eigenfaces with decreasing eigenvalues. They represent the directions in feature space in which there is the greatest variation, the next greatest, and so on.

Looking at the basis vectors displayed in the same arrangement as in the photographs it is clear that considerable information is preserved that would make it possible to identify a person simply by looking at the feature vectors presented as images. The upper-right eigenface bears a very strong resemblance to the woman in the center of the top row in the first image, for example.

Figure 3:
FIG. 3 are a pair of images that shows the results of attempting to reconstruct a known member of the reference set's image from a feature vector and the average image.

In common practical applications the identifiability of the subject can be even greater. To function, the eigenface system must preserve the k eigenfaces (the eigenvectors in the directions of greatest scatter) and the k-long feature vector for each face in the reference database. FIG. 3 shows the results of attempting to reconstruct a known member of the reference set's image from the feature vector and the average image. The picture on the left is the same as the first person in the original image. The image on the right combines the k eigenfaces with a strength equal to the weights of those eigenfaces in the image's feature vector and adds the result to the average image. The person on the right is almost certainly recognizable as a particular individual. In addition, this person's gender, race, ethnicity, and approximate age (which are all possible sources of profiling and discrimination) may be plainly discerned, regardless of whether the particular individual can be identified or not.

This system is the most obvious example of the inclusion of demographical characteristic information, but other current approaches are plagued by it as well. In the case of the eigenfaces approach, it is completely impossible to avoid the collection of demographic characteristics, because the functioning of the system requires it. In the next example the system does not require any information of a class-based nature in order to function. In fact, such information generally impedes its function. Nevertheless, keeping potentially harmful information out of feature vectors can prove difficult.

Point of interest-based facial recognition. Even techniques that do not directly use an entire facial image may still retain enough information to allow reconstruction and profiling. The following system example is presented to a) show of how unwanted class-based information gets into the feature vectors and the reference set—even when it looks like the approach should not allow it and, b) because this system functions well as a facial recognition system, it will be used to illustrate part of the teaching of this disclosure on how to keep such information out of the feature vector. In this section the flaws in this kind of feature vector are the primary point of the discussion. Later, when discussing the fixes as taught by this disclosure, the parts of the system that allow such fixes will be examined.

This example starts with extracting the digital fingerprint from the image using standard techniques from the industry. First, points are found where the absolute values of the Laplacian of the image pixel values exceed some threshold and then the points are characterized using the FREAK (Fast Retina Keypoint) binary feature set (see, for example, ALAHI, Alexandre et al., *FREAK: Fast Retina Keypoint*, Ecole Polytechnique Federale de Lausanne (EPFL), Switzerland). The effects shown would be essentially identical with any similar algorithms that use binary features. For algorithms that use non-binary features, the situation would be even less favorable.

Figure 4:
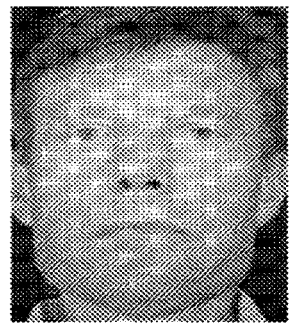
FIG. 4 is an image of a person's face acquired by a recognition or authentication system.

FIG. 4 shows a photograph of a person's face, acquired as part of a facial recognition system.

A point of interest is a location on the object where three things are believed to be true. First, the point is reliably localizable in the image. Thus, a point on a line cannot be reliably localized, since many points along the line look similar and they are difficult or impossible to tell apart. Second, the image in the area around the point has sufficient detail and variation to enable the point to be characterized more or less uniquely. Thus, one plain white area looks much like another, while a random crystal pattern in a bolt shows substantial detail unlikely to be duplicated elsewhere. Third, those characterizations are likely to be similar across different acquisitions of the same object and differ significantly among different objects.

Figure 5:
FIG. 5 is an image that shows a strength of the Laplacian across a digital image of FIG. 4, with black being the strongest and white the weakest.

There are many ways to find and characterize such points of interest in objects. One approach that can be used here is that points of interest are found based on the local strength of the Laplacian of the image intensities. FIG. 5 shows the strength of the Laplacian across this image, with black being the strongest and white the weakest.

In general, there are a great many such points at many different scales (width of the strongest Laplacian is a typical choice for scale). In the interest of speed, accuracy, computational efficiency, and storage minimization, only the strongest of these points are kept for further investigation. One way to determine relative strength is the (absolute) value of the Laplacian itself, normalized to the scale over which the Laplacian operates. The presumption, generally a good one in practice, is that points with stronger Laplacians are more likely to be present in different acquisitions. Filtering to, say, the top 6000 points yields FIG. 6.

Figure 6:
FIG. 6 is an image that demonstrate that even the location of the strongest N points of interest clearly produces a recognizable image that would allow identification of an individual by anyone familiar with the individual and easily allow knowledge of the demographic characteristics of that individual.

FIGS. 5 and 6 illustrate a point of this disclosure: even the location of the strongest N points of interest clearly produces a recognizable image that would allow identification of an individual by anyone familiar with the individual and easily allow knowledge of the demographic characteristics of that individual. This, and the similar localization of features in eigenfaces, shows why of all the features of standard biometrics, those that preserve the relative positioning among them also preserve the most extraneous class-based information.

Figure 7:
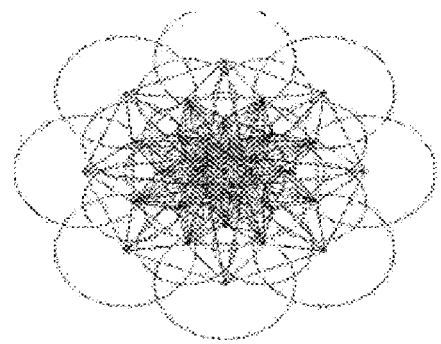
FIG. 7 is a schematic diagram of a pattern that can be imposed around each point of interest location at the appropriate scale, the illustrated pattern being a variant of the FREAK point characterizations.

Continuing with the current example, these points of interest are used as the center of regions to be further characterized. One way to do such characterization is to impose a pattern such as is shown in FIG. 7. This pattern is imposed around each point of interest location at the appropriate scale. Here, the pattern is imposed at a multiple of the scale of the strongest Laplacian around that point. The pattern shown here is a variant of the FREAK point characterizations.

Since FREAK is a binary characterizer, the average pixel value is calculated in each of the circles above and then the differences in the values between the various circles is calculated. The straight lines in FIG. 7 connect the regions from which those differences are extracted. The resulting difference values are binarized and these become the bits in the feature vector for this point of interest. The order of the bits can be defined in any repeatable order. When complete, each point of interest characterization contains the x, y location of the point, the optimum scale at the point, and the binarized image gradients across the object, listed in the designated order.

Such methods of characterization work well for identifying objects and are well understood in the art. What is less well understood is that considerably more class-based information is inadvertently included in such characterizations than is intended, information that is easily perceivable by people and that is subject to abuse. It should be kept in mind that what is shown next—the ability to pull unwanted information out of a binary feature vector—holds even more strongly with point of interest characterizations that are not binarized but contain information on image regions directly.

Figure 8:
FIG. 8 is an image that illustrates a reconstruction of an image from a digital fingerprint which contains or encodes positional information.

In the current example, the location of each point, the location and size of each circle in the pattern, and which end of each gradient is lighter is known. If, as is the case in the pattern above, there are 256 such bits, each circle can be "measured" by the number of non-zero bits that characterize the differences between its average pixel value and those circles it is connected to. If the circles are then ordered from the greatest to the least number of times this circle is the lighter and simply fill in the circle with that number as the value of all of its pixels, and then average the values of overlapping regions, and, finally, scale the result from 0 to 255, the following reconstruction emerges (see FIG. 8).

Figure 9:
FIG. 9 are a pair of images that allows comparison of the reconstructed image with the original image, illustrating that a large amount of unwanted information about the subject has been preserved in the digital fingerprint.

If the original image (see FIG. 9) is compared with the reconstruction, we see that a large amount of unwanted information about the subject has been preserved in the digital fingerprint.

The demographic characteristics of the subject may be plainly ascertained by viewing the reconstruction. Importantly, in the creation of the digital fingerprint there was no intention to gather such information. It may be assumed that the operators of most systems using these types of digital fingerprinting techniques generally do not even know that the system is collecting and retaining this kind of information as they do not use it in the normal functioning of the system.

Orientation Consistency Matching

The problem of preservation of sensitive class-based information arises largely from the preservation of positional information. As can be seen from FIGS. 5 and 6, even knowing where the Laplacian is strongest and doing no other image characterization is sufficient to capture sensitive or unwanted information. The teachings of this disclosure enable system operators to avoid this problem by avoiding the capture and retention of any such information, including positional information.

One solution to this problem would be to simply throw away the positional information in the feature vector. This, however, is generally infeasible. Without some means to filter the candidate point of interest matches, there are simply too many possibilities. The matching process would then require comparing the feature vectors of every test point of interest with every reference, rather than merely with those close enough to matching positions. Not only does this slow the computational process of matching down exponentially, but it opens up the opportunity for vastly more spurious matches. Simply throwing away the positional information without replacing it with another suitable filter characteristic is therefore not a good solution to the problem.

The solution, as taught by this disclosure, is to apply a filter to the matches that replaces rather than removes positional information. Many types of filters can be used and one working example will be provided herein without limitation.

Filtering on global orientation matching. Because the image around a point of interest location is generally not rotationally-symmetric, it is necessary to orient the image characterization pattern (see FIG. 7 for an example) prior to extracting the feature vector so that the same pattern will be extracted in each acquisition. Each resulting point of interest thus has an orientation that must be determined before the bit vectors can be compared or even extracted. This is always the case, i.e., to get any two points of interest to match, their orientations must match at least approximately, when the features are not, themselves, rotationally independent.

In a preferred embodiment, the orientation differences and their thresholds may therefore be used as a filter on allowable match attempts. For example, if both the test and the reference images were collected with the face vertical, matching points of interest on the two acquisitions should have approximately identical orientations. If they were acquired at some rotational difference 8, then match pairs should have orientations that differ by approximately 8. This approach is a highly effective filter in that it preserves high confidence matching without preserving unwanted positional information. However, this is but one example of a filter that could be employed for this purpose, many other methods of filtering could be applied under the teaching of this disclosure.

Figure 10:
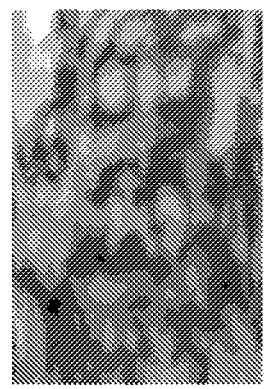
FIG. 10 is an image that shows an attempted reconstruction from a digital fingerprint in which global (or regional) consistency in orientation replaces a positional consistency requirement, illustrating that unwanted class-based information has effectively been removed.

In the above example, global (or regional) consistency in orientation replaces the positional consistency requirement, provides adequate filtering, and provides little degradation from using the positions as filters, while also preventing reconstruction of anything resembling the original image. The result of this filter being applied to the above example and the resulting attempted reconstruction is shown in FIG. 10. The reconstruction here places the points prior to attempted reconstruction not in their original locations but in order of their orientation, as their original locations are not known. The unwanted class-based information is, thereby, removed.

Performance tests show that such alterations in the feature vectors generally lead to a slight but acceptable decrease in performance. This means that there is a slight degradation in distinction between the best (presumably the correct) and next-best (presumably incorrect) reference chosen by the matching process, but it is not so significant that it leads to errors.

Illustrated System

Figure 11:
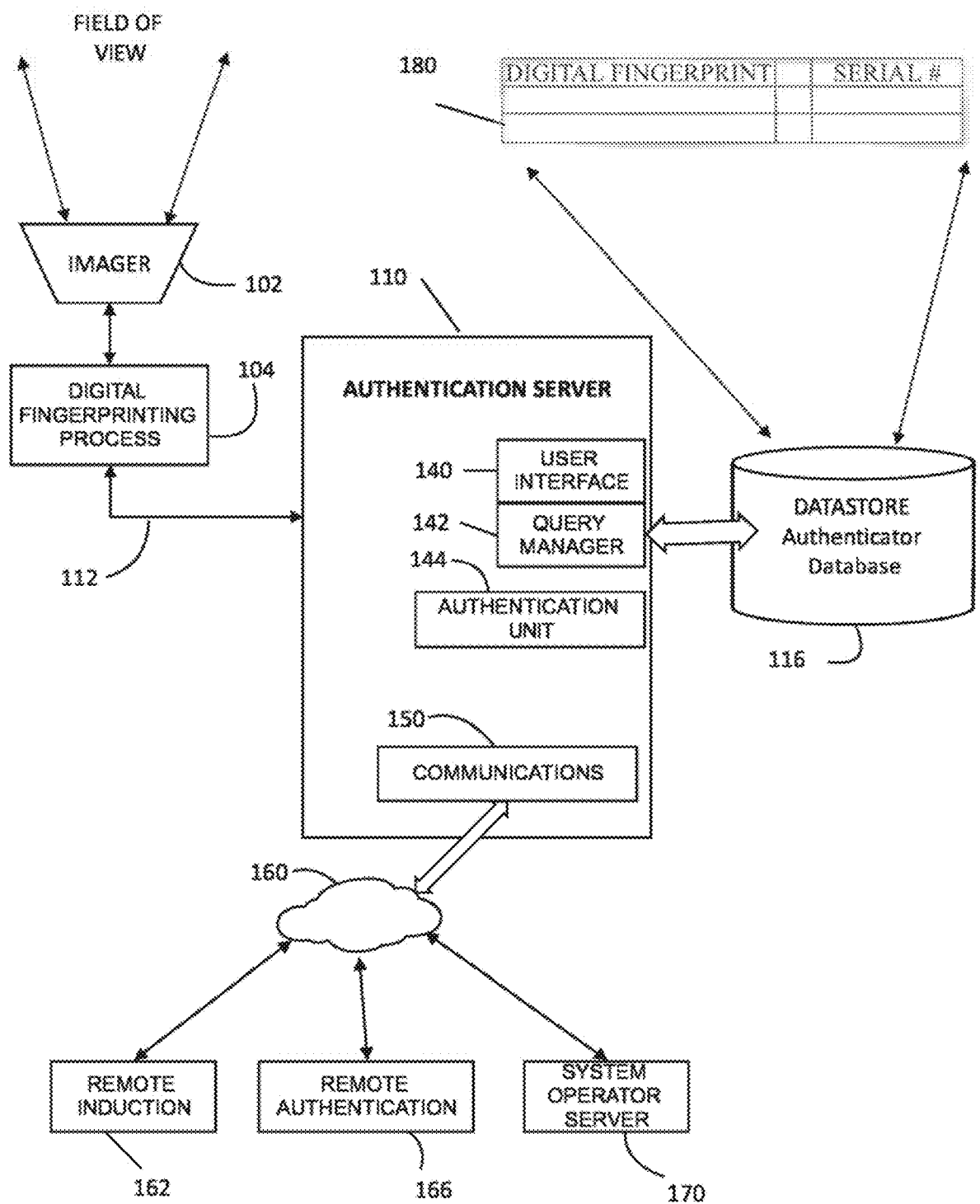
FIG. 11 is a simplified block diagram of one example of a system, according to at least one illustrated implementation.

FIG. 11 is a simplified block diagram of one example of a system consistent with the present disclosure. A person or other body or body part (not shown) may present a part of her body, for example, a face, hand, finger, etc. into the field of view of the scanner or imager 102, indicated by the dashed lines. The captured image data is processed by a process 104 to extract digital fingerprint(s) therefrom, preferably irreversible digital fingerprints. Digital fingerprinting in general is described in more detail below, and techniques for generating irreversible digital fingerprints discussed generally above, and specifically with reference to the methods illustrated in FIGS. 12-15. These elements may be discrete or integrated. For example, the scanner or imager may be a camera in a smartphone, and the digital fingerprinting process may be a software application executing on the same smartphone. Less preferably, intermediate data (for example, digital image data) may be transmitted over a network to a remote processor to generate one or more irreversible digital fingerprints from the image data. In some embodiments, a remote induction facility 162, for example, a kiosk, may communicate over a network 160 with an authentication server 110.

The digital fingerprint (e.g., irreversible digital fingerprint) of the user or subject may be securely communicated to the server 110 via path 112 using known communications technology. The server 110 is coupled to (or includes) a datastore 116. The data store may contain various databases and or tables, including, for example, records that store digital fingerprints (e.g., irreversible digital fingerprints). The server may implement, for example, a user interface 140, a query manager 142 for interaction with the datastore 116, and authentication process or application 144. One use of the authentication process may be to identify and or authenticate a person based on an acquired digital fingerprint (e.g., irreversible digital fingerprint) while not retaining sufficient information that would otherwise allow a reconstruction of the image from the irreversible digital fingerprint. To authenticate or identify a person, the authentication process 144 may acquire a digital fingerprint (e.g., irreversible digital fingerprint), for instance from a local scanner 102 or remotely 162, and using the query manager 142, search the datastore 116 to find a matching (or best match) digital fingerprint record. In a preferred embodiment, the authentication server stores the irreversible digital fingerprint in association with an assigned serial number in records 180 in the datastore 116. In this illustrative example, the server typically may also include a communications component 150. Various communications components 150 may be included to communicate for example, over a network 160 which may be local, wide area, internet, etc.

Figure 12:
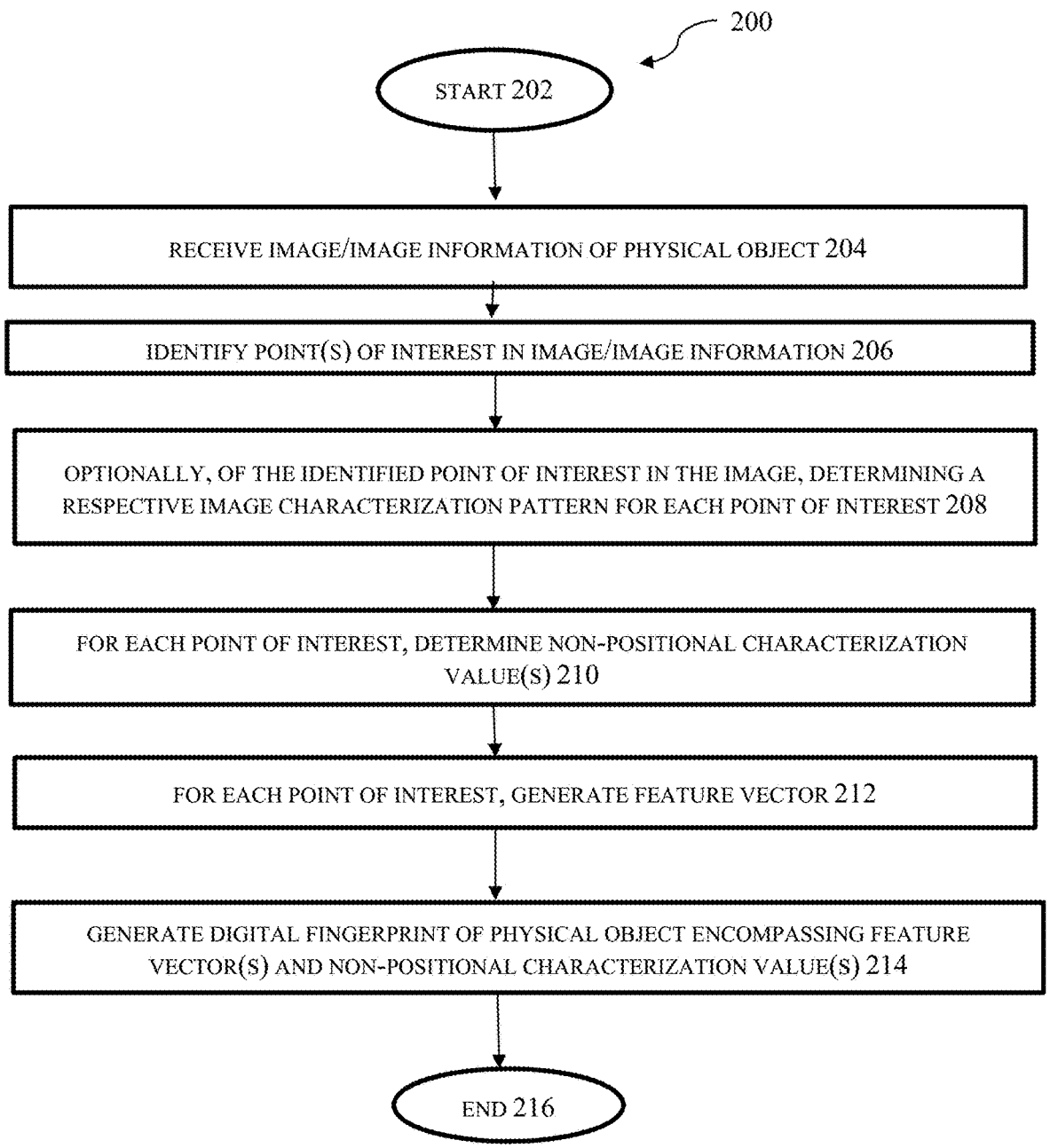
FIG. 12 is flow diagram illustrating a method of operation in the system of FIG. 1, according to at least one illustrated implementation.

FIG. 12 shows a method 200 of operation in a system to authenticate physical object according to at least one illustrated implementation. The method 200 may be executed to generate digital fingerprints of physical objects, whether those physical objects are to be authenticated or whether those physical objects are to serve as reference objects against which authentication will eventually be performed.

The method 200 starts at 202, for example in response to detection of a physical object to be authenticated in the field of view of a sensor (e.g., image sensor), receipt of information or data (e.g., images or image information), call or invocation by a calling routine, or some input.

At 204, the system receives one or more images of a physical object and/or image information that represents the physical object. The physical object may be a physical object that will serve as a physical object to be authenticated, referred to herein as a sample physical object. Alternatively, the physical object may be a physical object that will serve as a reference physical object, which serves as reference against which sample physical objects are assessed or authenticated against. For example, the system may advantageously employ digital fingerprints to determine whether a sample physical object is a later occurrence of a same physical object that had been previously encountered and digitally fingerprinted. In at least some implementations, a digital fingerprint of a physical object to be authenticated may be subsequently be ingested or otherwise entered into the system to itself serve as a reference digital fingerprint for subsequent authentication efforts. As described herein, a digital fingerprint may advantageous omit positional information that would otherwise allow recreation of a recognizable image of the physical object or an image from which one or more immutable characteristics or traits (e.g., physical appearance, color, race, ethnicity, gender, age) of the physical object may be discerned, and hence such digital fingerprints are denominated herein as irreversible digital fingerprints. Such may be particularly valuable where the physical object is a human or portion thereof, but may also be valuable where the physical object is another type of animal or even an inanimate physical object.

At 206, the system identifies one or more points of interest in the digital image or in image information. The system may employ any of a variety of techniques to identify one or more points of interest, for example those described elsewhere herein.

Optionally at 208, the system can determine, for each of the identified points of interest in the image, a respective image characterization pattern spatially associated with the respective point of interest. The image characterization pattern can, for example, take the form of an area or volume that surrounds the respective point of interest, for instance a defined number of pixels in each direction extending outward of the respective point of interest. The number of pixels in each direction may be equal to one another to create a uniform image characterization pattern (e.g., 3×3 array, 5×5 array each with the point of interest in a center positon of the array). Alternatively, the number of pixels in each direction may be unequal to one another to create a non-uniform image characterization pattern (e.g., 3×5 array, 5×15 array).

At 210, the system determines one or more non-positional characterization values for each point of interest. The non-positional characterization values are representative or characterize a respective point of interest in an image of the physical object in a way that does not allow the image to be reconstituted from the digital fingerprint, yet in a way that allows a non-positional relationship between points of interest in two images to be assessed. While the system may employ any one or more of a variety of criteria or parameters as non-positional characterization values, examples described herein include, for instance, orientation (e.g., orientation angle), scale (e.g., width of strongest Laplacian or Hessian) and filter response (e.g., absolute value of Laplacian or Hessian). In at least some implementations, the system determines the non-positional characterization values for each point of interest based on an image characterization region spatially associated with a respective points of interest, e.g., surrounding the respective point of interest. For instance, the system can determine the one or more non-positional characterization values for each point of interest based on an orientation, scale and/or filter response of the characterization pattern spatially associated with the respective point of interest.

Thus, the system can, for example, determine a respective orientation angle of one or more points of interest represented by the sample digital fingerprint of a physical object to be authenticated. For instance, the system can determine a respective orientation of an image characterization region spatially associated with a respective one of the one or more points of interest represented by the sample digital fingerprint.

Additionally or alternatively, the system can, for example, determine a respective scale of the one or more points of interest represented by the sample digital fingerprint of a physical object to be authenticated. For instance, the system can determine a width of a strongest Laplacian or Hessian of an image characterization region spatially associated with a respective one of the one or more points of interest represented by the sample digital fingerprint.

Additionally or alternatively, the system can, for example, determine a respective filter response of the one or more points of interest represented by the sample digital fingerprint of a physical object to be authenticated. For instance, the system can determine an absolute value of a Laplacian or Hessian of an image characterization region spatially associated with a respective one of the one or more points of interest represented by the sample digital fingerprint.

At 212, the system generates a respective feature vector for each point of interest. As previously described, feature vectors characterize features that appear at particular locations, called points of interest, in images of a two-dimensional (2-D) or three-dimensional (3-D) physical object.

At 214, the system generates a digital fingerprint of physical object, the digital fingerprint encompassing one or more feature vectors and non-positional characterization values. The digital fingerprint preferably takes the form of an irreversible digital fingerprint, from which an image with recognizable immutable characteristics or traits cannot be formed.

The method 200 may end or terminate at 216, until invoked again. Alternatively, the method 200 may repeat periodically or aperiodically. The method 200 may, for example, execute as one or more threads on a multi-threaded processor.

Figure 13:
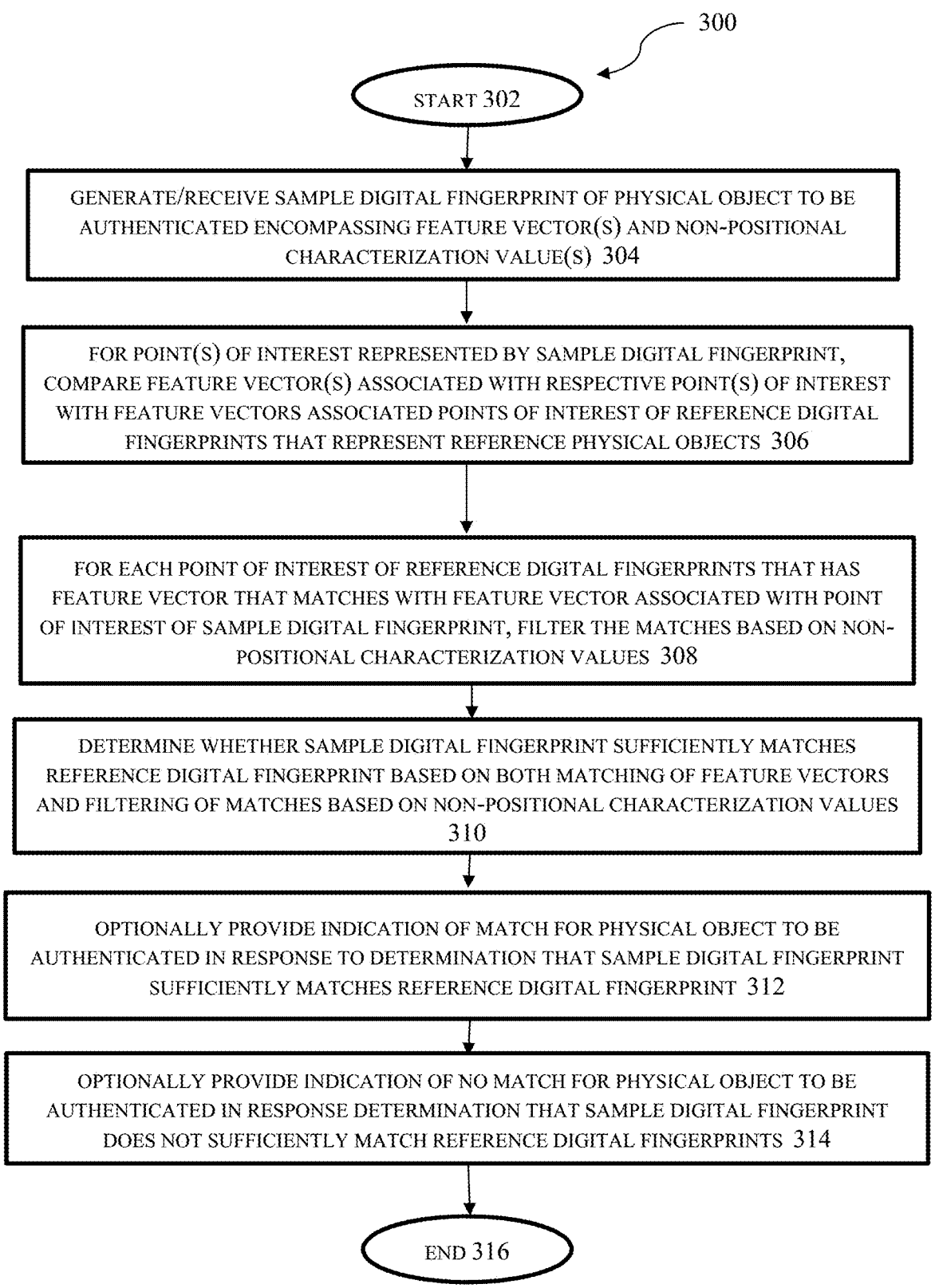
FIG. 13 is flow diagram illustrating a method of operation in the system of FIG. 1, according to at least one illustrated implementation.

FIG. 13 shows a method 300 of operation in a system to authenticate physical object according to at least one illustrated implementation.

The method 300 starts at 302, for example in response to detection of a physical object to be authenticated in the field of view of a sensor (e.g., image sensor), receipt of information or data (e.g., images or image information), call or invocation by a calling routine, or some input.

At 304, the system generates and/or receives a sample digital fingerprint of a physical object to be authenticated encompassing one or more feature vectors and one or more non-positional characterization values. Each feature vector is representative of or characterize a respective point of interest in the image of the physical object to be authenticated. One or more non-positional characterization values are representative or characterize a respective point of interest in the image of the physical object to be authenticated in a way that does not allow the image to be reconstituted from the digital fingerprint. The system may, for example, execute the method 200 (FIG. 12) to generate a sample digital fingerprint of a physical object to be authenticated.

At 306, for one or more points of interest represented by sample digital fingerprint, the system compares a respective feature vector associated with respective point of interest with one or more feature vectors associated one or more points of interest of one or more reference digital fingerprints that represent one or more reference physical objects. Various approaches for comparing feature vectors are described elsewhere herein (e.g., finding a minimum threshold distance to find matching pair). The matches do not need to be exact matches, but rather can be matches within a first range which may be a user specified range or system specified range.

At 308, for each point of interest of the reference digital fingerprint that has a respective feature vector that matches, within a first range, with a feature vector associated with a respective point of interest of the sample digital fingerprint (denominated herein as a matched pair of points of interest), the system filters the matches based on non-positional characterization values. This advantageously allows matching or filtering to be performed without use of positional information.

The filtering does not need to be for exact values, but rather can employ a second range may be a user specified range or system specified range. Thus, for example, the system can determine whether a respective at least one non-positional characterization value for the point of interest of the reference digital fingerprint is within a second range of the respective at least one non-positional characterization value of the point of interest represented by the sample digital fingerprint.

To determine whether a respective at least one non-positional characterization value for the point of interest of the reference digital fingerprint is within a second range of the respective at least one non-positional characterization value of the point of interest represented by the sample digital fingerprint the system, for instance, can: i) determine whether a first type of non-positional characterization value for the point of interest of the reference digital fingerprint is within a first specified range of the respective non-positional characterization value of the point of interest represented by the sample digital fingerprint, and then ii) determine whether a second type of non-positional characterization value for the point of interest of the reference digital fingerprint is within a second specified range of the respective non-positional values. They system can likewise check for a tertiary of further type of positional characterization value for the point of interest. Employing two or more types of positional characterization values, for instance applied sequentially, may substantially improve accuracy.

At 310, the system determines whether a sample digital fingerprint sufficiently matches a reference digital fingerprint based on both matching of feature vectors and filtering of matches based on non-positional characterization values.

Optionally at 312, the system provides an indication of a match for the physical object to be authenticated in response to a determination that the sample digital fingerprints sufficiently matches one or more of the reference digital fingerprints. Such can include providing a message or alert to a human user and/or providing a message or alert to a device or machine. Advantageously, the system can provide an indication of the match that does not identify an identity of either the physical object to be authenticated nor the reference physical object. For instance, where the sample digital fingerprint represents a portion of a human, the reference digital fingerprints represent portions of two or more humans, the system can provide an indication of a match for the physical object to be authenticated that does not identify any of the humans.

Optionally at 314, the system provides an indication of no match for the physical object to be authenticated in response determination that sample digital fingerprint does not sufficiently match any of the reference digital fingerprints.

The method 300 may end or terminate at 316, until invoked again. Alternatively, the method 300 may repeat periodically or aperiodically. The method 300 may, for example, execute as one or more threads on a multi-threaded processor.

Figure 14:
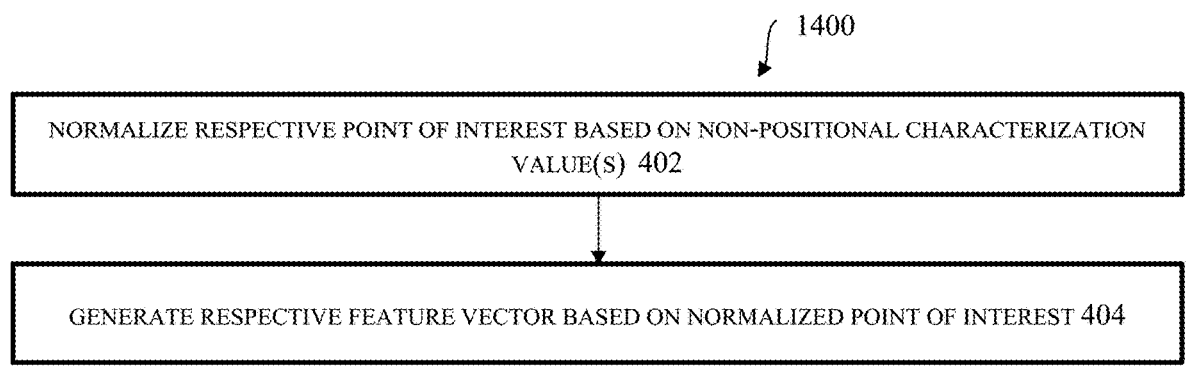
FIG. 14 is flow diagram illustrating a method of operation in the system of FIG. 1, according to at least one illustrated implementation.

FIG. 14 shows a method 400 of operation in a system to authenticate physical object according to at least one illustrated implementation.

The method 400 may be invoked by a calling routine, for example invoked as part of performing the method 200 (FIG. 12) or method 300 (FIG. 13). For instance, the method 400 may be invoked before comparing the one or more feature vectors associated with respective ones of the one or more points of interest represented by the sample digital fingerprint with the one or more feature vectors associated with the one or more points of interest of the plurality of reference digital fingerprints.

At 402, the system normalizes respective points of interest based on the one or more non-positional characterization values for that point of interest. To normalize the respective points of interest based on the determined respective at least one non-positional characterization value for the point of interest, the system can, for example, normalize an image characterization region spatially associated with a respective one of the one or more points of interest represented by the sample digital fingerprint.

At 404, the system generates a respective feature vector based on the normalized point of interest. Various techniques to generate feature vectors are described in detail elsewhere herein and not repeated in the interest of brevity.

Figure 15:
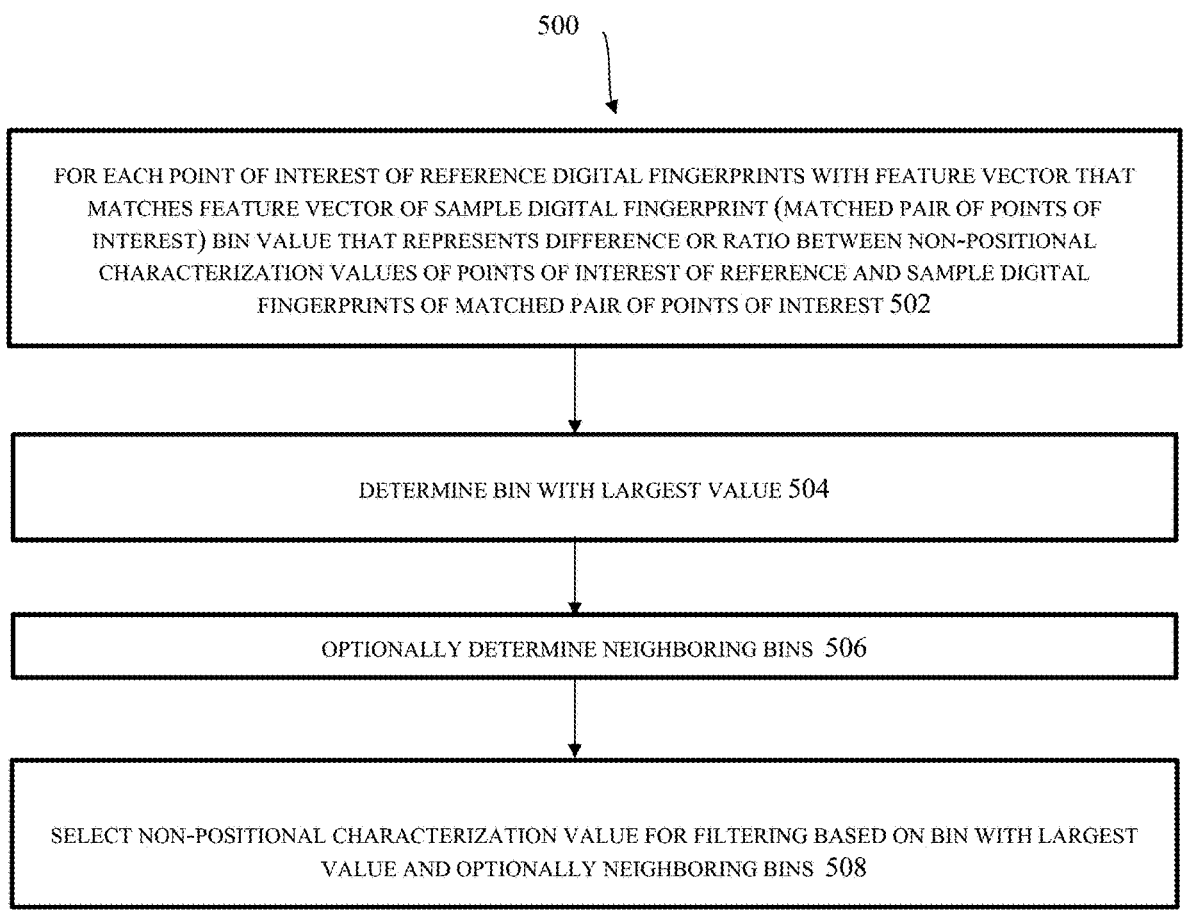
FIG. 15 is flow diagram illustrating a method of operation in the system of FIG. 1, according to at least one illustrated implementation.

FIG. 15 shows a method 500 of operation in a system to authenticate physical object according to at least one illustrated implementation.

The method 500 may be invoked by a calling routine, for example invoked as part of performing the method 200 (FIG. 12) or method 300 (FIG. 13).

At 502, for each point of interest of reference digital fingerprints with feature vector that matches feature vector of sample digital fingerprint (matched pair of points of interest) the system bins a value that represents difference or ratio between non-positional characterization values of points of interest of reference and sample digital fingerprints of matched pair of points of interest.

For example, for each of the one or more points of interest of the plurality of reference digital fingerprints that has a respective feature vector that matches within the first range with one of the feature vectors associated with respective ones of the one or more points of interest represented by the sample digital fingerprint, those matching points of interest denominated herein as a matched pair of points of interest, the system can bin a value that represents a difference or a ratio between the at least one non-positional characterization value for the point of interest of the reference digital fingerprint and the at least one non-positional characterization value of the point of interest represented by the sample digital fingerprint of the matched pair of points of interest.

To bin, the system can, for instance, increment a count in a corresponding bin for each of the matched pair of points of interest having a respective difference or a respective ratio between the at least one of the non-positional characterization values of the matched pair of points of interest that falls within a range of the respective bin. The binning may, for instance include incrementing a count in a corresponding orientation angle bin (e.g., 360 bins each covering one respective degree of difference in orientation from 0 degrees to 360 degrees) for each of the matched pair of points of interest having a respective difference in orientation angle that falls within a range of the respective orientation angle bin.

At 504, the system can, for example, determines a bin that has the largest value. For instance, the number of points of interest that have an at least approximately equal difference in orientation or ratio of scaling, or filter response.

Optionally at 506, the system determines one or more neighboring bins that are successively adjacent to the bin that has the largest value in terms of the particular value being used for the non-positional characterization value. This facilitates capturing relatively small mismatches. For example, where a different in orientation of, for instance an image characterization region spatially associated with a respective one of the one or more points of interest, is say 45 degrees, and the bins are in one degree increments, this can allow the capture of differences of say plus or minus 1, or 2 or 3 degrees from the nominal 45 degree difference.

At 508, the system selects a non-positional characterization value for filtering based on the determined bin with largest value and optionally neighboring bins. For example, the filtering can be based on the range of the respective orientation angle bin having the highest count. the filtering is based on the range of the respective orientation angle bin having the highest count (e.g., 45 degrees) and based on the range of at least one orientation angle bin (e.g., 44 degrees and 46 degrees; 43 and 44 and 46 and 47 degree bins) that is successively adjacent to the orientation angle bin having the highest count.

Authentication Regions and Digital Fingerprinting

Because the devices, systems, and methods described herein may be used with many different types of objects, it is sometimes helpful to describe what parts of the digital images of the objects may be used for the extraction of features for identification or authentication purposes. This can vary widely for different classes of objects. In some cases, it is the image of the entire object; in other cases, it will be a specific sub-region of the image of the object.

For instance, for a photograph, the digital image of the entire photograph may in some cases be used for feature extraction. Each photograph is different, and there may be unique feature information anywhere in the photograph. So, in this case, the selected authentication region may be the entire photograph.

Multiple authentication regions may be used for digital fingerprints for several reasons. One reason may be to focus attention on regions where significant variations take place among different similar objects that can be distinguished. Another reason may be to avoid focusing attention on the same objects in regions of little significance where there is little or no variation among different objects. In this way, the authentication region may be suitably used to include regions of heightened interest and to eliminate regions of little interest.

A bank note, for example, has a sufficient number of unique features that it can be authenticated if a few small arbitrary regions scattered across the surface are fingerprinted, along with recognizing the contents of a region telling the value of the bank note and one containing the bank note's serial number. In such a case, the digital fingerprints of any region along with sufficient additional information to determine the bank note's value and its purported identity may be sufficient to establish the authenticity of the note, and multiple fingerprinted regions are used solely in the event that one or more regions may be absent (e.g., tearing, defacement, or the like) when the bill is later presented for authentication.

Sometimes, however, specific regions of an object are authenticated to provide acceptable confidence that the item is both authentic and has not been altered. A passport provides an example. On a passport, the features preferably used for authentication are extracted from regions containing such specific identification information as the passport number, recipient name, and recipient photo. In that case, a template can be defined that includes all those regions whose alteration from the original would invalidate the passport; such regions including the passport holder's photo and unique personal data.

The ability to define and store a selected authentication region for a given class of objects may provide significant benefits to the user. In many cases it is much easier to scan a limited region of an object than the entire object. For instance, in the case of an article of designer clothing, it is much easier to take a picture of the manufacturer's label than it is to take a picture of the entire garment. Further, defining such regions enable the detection of partial alteration of the object.

Once an authentication region is defined, specific applications can be created for different markets and classes of objects that can assist the user in locating and scanning any number of selected authentication regions. For instance, an appropriately sized location box and crosshairs can automatically appear in the viewfinder of a smartphone camera application to help the user center the camera on the authentication region, and automatically lock onto the region and take the picture when the camera is focused on the correct area.

In many cases, objects may have permanent labels or other identifying information attached to them. These can also be used as sources of characterizing features. For instance, wine may be put into a glass bottle and a label affixed to the bottle. Since it is possible for a label to be removed and reused, simply using the label itself as the authentication region is often not sufficient. In this case the authentication region may be defined to include both the label and the substrate the label is attached to, which in this case is some portion of the glass bottle. This label and substrate approach may be useful in defining authentication regions for many types of objects, such as consumer goods and pharmaceutical packaging. If a label has been moved from its original position, this can be an indication of tampering or counterfeiting. If the object has "tamper-proof" packaging, this may also be useful to include in the authentication region.

In some cases, multiple authentication regions may be used to extract unique features. For a firearm, for example, features may be extracted from two or more different parts of the weapon. Here, authentication may include matching digital fingerprints of each of the different parts of the original. Alternatively, or additionally, since two or more parts may have been taken from the original weapon and affixed to a weapon of substandard quality, it may also be important to determine whether the relative positions of the two or more parts have changed as well. In other words, some embodiments may determine that the distance or other characteristic between Part A's authentication region and Part B's authentication region is effectively unchanged, and only if that is accomplished can the weapon be authenticated.

In a preferred embodiment, orientation differences and associated match thresholds may be applied as filters within one or more authentication regions, e.g. on a region-to-region basis.

Object Feature Template Definition and Digital Fingerprinting

When a new type or class of object is being scanned into at least some of the system embodiments described herein for the first time, the system can create an Object Feature Template that can be used to improve subsequent authentication operations for that class of objects. The improvements can be by way of faster digital fingerprint generation, more efficient repository operations, and in other ways. The Object Feature Template can either be created automatically by the system, or by using a human-assisted process.

An Object Feature Template is not required for the system to authenticate an object, as the system can automatically extract features and generate a digital fingerprint of an object without it. However, the presence of a template can improve the authentication process and add additional functionality to the system. A non-limiting, exemplary Object Feature Template is represented in Table 1.

Table 1. Example Object Feature Template.
Class:
[Description of the object]
United States Passport
AUTHENTICATION REGION:
[Description of the authentication regions for the object]
Region 1: (x1, y1, z1), (x2, y2, z2)
Region n
REGION MATCH LIST
[List of the Regions that are Required by the Template to Match to Identify an Object]
Region List: 1 . . . n
FEATURES:
[Key features of the object]
Feature 1: Passport Number
Feature 2: Photo
Feature 3: First Name
Feature 4: Last Name
Feature n
Methods:
[Programs that can be run on features of an object]
Feature 2:
Photo Method 1: [checkphoto.exe] Check for uneven edges indicating photo substitution
.
.
.
Method n
Feature n
Method n
ADDITIONAL DATA
[Additional data associated with the object]
Data 1: example data
.
.
.
Data n The uses of the Object Feature Template include, but are not limited to, determining the regions of interest on the object, the methods of extracting fingerprinting feature information and other information from those regions of interest, and methods for comparing such features at different points in time. The name "object feature template" is exemplary; other data with similar functionality and one or more different identifiers should be considered equivalent.

Once an object has been scanned and at least one authentication region has been identified, the final digital image that will be used to create the unique digital fingerprint for the object is created. This image or set of images will provide the source information for the feature extraction process.

A "digital fingerprinting feature" is a feature of the object that is innate to the object itself, which may be a result of the manufacturing process, a result of external processes, or of any other random or pseudo random process. For example, gemstones have a crystal pattern which provides an identifying feature set. Every gemstone is unique, and every gemstone has a series of random flaws in its crystal structure. This crystal pattern may be used to generate feature vectors for identification and authentication.

A "feature" in this description as used in the generation of a digital fingerprint is not concerned with reading or recognizing meaningful content by using methods like optical character recognition (OCR). For example, a label on a scanned object with a printed serial number may give rise to various features in fingerprint processing, some of which may become part of a digital fingerprint feature set or vector that is associated with the object. The features may refer to light and dark areas, locations, spacing, ink blobs, etc. This information may refer to the printed serial number on the label, but in the normal course of feature extraction during the fingerprinting process there is no effort to actually "read" or recognize the printed serial number.

As part of identifying the object, however, for ease of comparison of fingerprint features with those of the original which are stored in the object database, such information may in some embodiments be read and stored by utilizing such techniques as optical character recognition. In many cases, serial numbers may be used as a primary index into a manufacturer's database, which may also contain the digital fingerprints. It would be faster, for example, to determine whether a bank note being inspected is a match with a particular original if the serial number, say "A93188871A," can be used as an index into the digital fingerprinting database, rather than trying to determine which digital fingerprint in the repository is matched by iterating through many (e.g., hundreds, thousands, millions, or some other number) of fingerprints. In this case, and in similar cases of, weaponry, passport serial numbers, and other objects, the index recognition may speed up the comparison process, but an index or other such conventional recognition is not essential to the comparison process.

Once a suitable digital fingerprint of an object is generated, the digital fingerprint may be stored or "registered" in a repository such as a database. For example, in some embodiments, the digital fingerprint may comprise one or more fingerprint features, which are stored as feature vectors. The repository should be secure. In some embodiments, a unique identifier (ID) such as a serial number also may be assigned to an object. An ID may be a convenient index in some applications. However, such an ID is not essential, as a digital fingerprint itself can serve as a key for searching a repository. In other words, by identifying an object by the unique features and characteristics of the object itself, identifiers, labels, tags, etc., become unnecessary to an authentication of the object.

Because in many of the cases described herein features are extracted from images produced under variable lighting conditions, it is unlikely to a determined and acceptable statistical certainty (e.g., less than 20% chance, less than 1% chance, less than 0.01% chance, less than $(1\times10^{\wedge}(-10))$ chance, or some other value) that two different "reads" will produce the exact same digital fingerprint. In a preferred embodiment, the system is arranged to look up and match items in the database when there is a "near miss." For example, two feature vectors, [0, 1, 5, 5, 6, 8] and [0, 1, 6, 5, 6, 8], are not identical, but by applying an appropriate difference metric, the system can determine that the two feature vectors are close enough to confirm to an acceptable level of certainty that they are from the same item that has been digitally fingerprinted or inducted before. One example is to calculate Euclidean distance between the two vectors in multi-dimensional space and compare the result to a threshold value. This is similar to the analysis of human fingerprints. Each fingerprint taken is slightly different, but the identification of key features allows a statistical match with an acceptably high degree of certainty.

Hardware and Software

At least some of the structures (e.g., devices, apparatus, systems and the like) discussed herein comprise electronic circuits and other hardware along with associated software. For example, a conventional portable device (e.g., mobile phone, smartphone, tablet, wearable computer, Internet of Things (IoT) device, and other such computing devices) is likely to include one or more processors and software executable on those processors to carry out the operations described. The term software is used herein in its commonly understood sense to refer to programs or routines (e.g., subroutines, objects, plug-ins, etc.), as well as data, usable by a machine or processor. As is well known, computer programs generally comprise instructions that are stored in tangible, non-transitory machine-readable or computer-readable, storage media. Some embodiments of the present disclosure may include executable programs or instructions that are stored in machine-readable or computer-readable storage media, such as a digital memory. One of skill in the art will recognize that a computer, in the conventional sense, is not required in any particular embodiment. For example, various processors, embedded or otherwise, may be used in equipment taught in the present disclosure.

Memory for storing software is well known. In some embodiments, memory associated with a given processor may be stored in the same physical device as the processor (i.e., on-board memory); for example, RAM or FLASH memory disposed within an integrated circuit microprocessor or the like. In other examples, the memory comprises an independent device, such as an external disk drive, storage array, or portable FLASH key fob. In such cases, the memory becomes associated with the digital processor when the two are operatively coupled together, or in communication with each other, for example by an I/O port, a communication bus, network connection, etc., such that the processor can read information (e.g., a file) stored on the memory. Associated memory may be read-only memory by design (ROM) or by virtue of permission settings, or not. Other examples include, but are not limited to, WORM, EPROM, EEPROM, FLASH, etc. Those technologies often are implemented in solid state semiconductor devices such as integrated circuits. Other memories may comprise moving parts, such as a conventional rotating disk drive. All such memories are machine readable, computer-readable, or another like term, and all such memories may be used to store executable instructions for implementing one or more functions described herein.

A software product refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. Those of ordinary skill in the art recognize that software can be distributed via electronic transmission (e.g., download), in which case there will at least sometimes be a corresponding software product at the transmitting end of the transmission, the receiving end of the transmission, or both the transmitting and receiving ends of the transmission.

As described herein, for simplicity, a user of the devices, systems, and methods may in some cases be described in the context of the male gender. As the context may require in this disclosure, except as the context may dictate otherwise, the singular shall mean the plural and vice versa; all pronouns shall mean and include the person, entity, firm or corporation to which they relate; and the masculine shall mean the feminine and vice versa.

Unless defined otherwise, the technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

In the present disclosure, when an element (e.g., component, circuit, device, apparatus, structure, layer, material, or the like) is referred to as being "on," "coupled to," or "connected to" another element, the elements can be directly on, directly coupled to, or directly connected to each other, or intervening elements may be present. In contrast, when an element is referred to as being "directly on," "directly coupled to," or "directly connected to" another element, there are no intervening elements present.

The terms "include" and "comprise" as well as derivatives and variations thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present disclosure, the terms first, second, etc., may be used to describe various elements, however, these elements are not be limited by these terms unless the context clearly requires such limitation. These terms are only used to distinguish one element from another. For example, a first machine could be termed a second machine, and, similarly, a second machine could be termed a first machine, without departing from the scope of the inventive concept.

The singular forms "a," "an," and "the" in the present disclosure include plural referents unless the content and context clearly dictates otherwise. The conjunctive terms, "and" and "or" are generally employed in the broadest sense to include "and/or" unless the content and context clearly dictates inclusivity or exclusivity as the case may be. The composition of "and" and "or" when recited herein as "and/or" encompasses an embodiment that includes all of the elements associated thereto and at least one more alternative embodiment that includes fewer than all of the elements associated thereto.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

The headings and Abstract of the Disclosure provided herein are for convenience only and do not interpret the scope or meaning of the embodiments.

The irreversible digital fingerprint embodiments as taught in the present disclosure provide several technical effects and advances to the field of authentication, identification, tracking, and many other fields as apparent to those of skill in the art. Technical effects and benefits include the ability for a user to generate or otherwise acquire at least one digital fingerprint of an object, store the at least one digital fingerprint in a repository with confidence that the exact same object can be later identified to an acceptable level of certainty without capture, retention, and/or reference to certain characterizing object information which the user desires to avoid. These and other technical effects are implemented with scanning technology, digital image processing technology, and other computing technology.

EXAMPLES

Example 1. A method of authenticating physical objects, comprising:

for a sample digital fingerprint of a physical object to be authenticated,
   determining a respective at least one non-positional characterization value for one or more points of interest represented by the sample digital fingerprint of a physical object to be authenticated;
   for at least one of the one or more points of interest represented by the sample digital fingerprint of the physical object to be authenticated, comparing one or more feature vectors associated with respective ones of the one or more points of interest represented by the sample digital fingerprint with one or more feature vectors associated with one or more points of interest of a plurality of reference digital fingerprints that represent one or more reference physical objects;
   for each of a number of the one or more points of interest of the plurality of reference digital fingerprints that has a respective feature vector that matches within a first range with at least one of the feature vectors associated with respective ones of the one or more points of interest represented by the sample digital fingerprint, filtering the matches based at least in part on the non-positional characterization values; and
   determining whether the sample digital fingerprint sufficiently matches at least one of the reference digital fingerprint based on both the matching of the feature vectors within the first range and the filtering of the matches based at least in part on the non-positional characterization values within the second range.

Example 2. The method of example 1 wherein determining a respective at least one non-positional characterization value of one or more points of interest represented by the sample digital fingerprint of the physical object to be authenticated includes determining a respective orientation angle of one or more points of interest represented by the sample digital fingerprint of a physical object to be authenticated.

Example 3. The method of example 2 wherein determining a respective orientation angle of one or more points of interest represented by the sample digital fingerprint of a physical object to be authenticated includes determining a respective orientation of an image characterization region spatially associated with a respective one of the one or more points of interest represented by the sample digital fingerprint.

Example 4. The method of example 1 wherein determining a respective at least one non-positional characterization value of one or more points of interest represented by the sample digital fingerprint of the physical object to be authenticated includes determining a respective scale of the one or more points of interest represented by the sample digital fingerprint of a physical object to be authenticated.

Example 5. The method of example 4 wherein determining a respective scale of the one or more points of interest represented by the sample digital fingerprint of a physical object to be authenticated includes determining a width of a strongest Laplacian or Hessian of an image characterization region spatially associated with a respective one of the one or more points of interest represented by the sample digital fingerprint.

Example 6. The method of example 1 wherein determining a respective at least one non-positional characterization value of one or more points of interest represented by the sample digital fingerprint of the physical object to be authenticated includes determining a respective filter response of the one or more points of interest represented by the sample digital fingerprint of a physical object to be authenticated.

Example 7. The method of example 6 wherein determining a respective filter response of the one or more points of interest represented by the sample digital fingerprint of a physical object to be authenticated includes determining an absolute value of a Laplacian or Hessian of an image characterization region spatially associated with a respective one of the one or more points of interest represented by the sample digital fingerprint.

Example 8. The method of example 1 wherein filtering the matches based at least in part on the non-positional characterization values includes determining whether a respective at least one non-positional characterization value for the point of interest of the reference digital fingerprint is within a second range of the respective at least one non-positional characterization value of the point of interest represented by the sample digital fingerprint.

Example 9. The method of example 8 wherein determining whether a respective at least one non-positional characterization value for the point of interest of the reference digital fingerprint is within a second range of the respective at least one non-positional characterization value of the point of interest represented by the sample digital fingerprint includes: i) determining whether a first type of non-positional characterization value for the point of interest of the reference digital fingerprint is within a first specified range of the respective non-positional characterization value of the point of interest represented by the sample digital fingerprint, and then ii) determining whether a second type of non-positional characterization value for the point of interest of the reference digital fingerprint is within a second specified range of the respective non-positional values.

Example 10. The method of any of examples 1 through 9, further comprising:

for each of the one or more points of interest represented by the sample digital fingerprint of the physical object to be authenticated,
  i) normalizing the respective point of interest based on the determined respective at least one non-positional characterization value for the point of interest; and
  ii) generating the respective feature vector based on the normalized respective point of interest,
before comparing the one or more feature vectors associated with respective ones of the one or more points of interest represented by the sample digital fingerprint with the one or more feature vectors associated with the one or more points of interest of the plurality of reference digital fingerprints.

Example 11. The method of example 10 wherein normalizing the respective point of interest based on the determined respective at least one non-positional characterization value for the point of interest includes normalizing an image characterization region spatially associated with a respective one of the one or more points of interest represented by the sample digital fingerprint.

Example 12. The method of example 10, further comprising:

generating the sample digital fingerprint of the physical object to be authenticated that encompasses the generated feature vectors for the one or more points of interest and the non-positional characterization values for one or more points of interest represented by the sample digital fingerprint of a physical object to be authenticated.

Example 13. The method of example 8, further comprising:

for each of the one or more points of interest of the plurality of reference digital fingerprints that has a respective feature vector that matches within the first range with one of the feature vectors associated with respective ones of the one or more points of interest represented by the sample digital fingerprint, those matching points of interest comprising a matched pair of points of interest, binning a value that represents a difference or a ratio between the at least one non-positional characterization value for the point of interest of the reference digital fingerprint and the at least one non-positional characterization value of the point of interest represented by the sample digital fingerprint of the matched pair of points of interest.

Example 14. The method of example 13 wherein the binning includes: incrementing a count in a corresponding bin for each of the matched pair of points of interest having a respective difference or a respective ratio between the at least one of the non-positional characterization values of the matched pair of points of interest that falls within a range of the respective bin.

Example 15. The method of example 13 wherein the binning includes: incrementing a count in a corresponding orientation angle bin for each of the matched pair of points of interest having a respective difference in orientation angle that falls within a range of the respective orientation angle bin.

Example 16. The method of example 15 wherein the filtering is based on the range of the respective orientation angle bin having the highest count.

Example 17. The method of example 15 wherein the filtering is based on the range of the respective orientation angle bin having the highest count and based on the range of at least one orientation angle bin that is successively adjacent to the orientation angle bin having the highest count.

Example 18. The method of example 1, further comprising:

in response to determining that the sample digital fingerprint sufficiently matches at least one of the reference digital fingerprint based on both the matching of the feature vectors within the first range and the matching of non-positional characterization values within the second range providing an indication of a match for the physical object to be authenticated.

Example 19. The method of example 18 wherein providing an indication of a match for the physical object to be authenticated includes: providing an indication of the match that does not identify an identity of either the physical object to be authenticated nor the reference physical object.

Example 20. The method of example 18 wherein the sample digital fingerprint represents a portion of a human, the reference digital fingerprints represent portions of two or more humans, and providing an indication of a match for the physical object to be authenticated includes: providing an indication of the match that does not identify any of the humans.

Example 21. The method of example 1, further comprising:

identifying one or more points of interest in a digital image,
  for each of the identified points of interest in the digital image, determining a respective image characterization pattern spatially associated with the respective point of interest, and wherein determining a respective at least one non-positional characterization value for one or more points of interest represented by the sample digital fingerprint of a physical object to be authenticated comprises determining at least one non-positional characterization value of the respective characterization pattern spatially associated with the respective point of interest for the one or more points of interest represented by the digital fingerprint of a physical object to be authenticated.

Example 22. The method of example 1, further comprising:

in response determining that the sample digital fingerprint does not sufficiently match at least one of the reference digital fingerprint based on both the matching of the feature vectors within the first range and the filtering of the matches based at least in part on the non-positional characterization values within the second range, providing an indication of a lack of a match for the physical object to be authenticated.

Example 23. A system, comprising:

at least one processor; and
at least one nontransitory processor-readable medium communicatively coupled to the at least one processor and which stores processor-executable instructions which, when executed by the at least one processor, cause the at least one processor to perform any of the methods of examples 1 through 22.

Example 24. A system of authenticating physical objects, comprising:
- at least one processor;
- at least one nontransitory processor-readable medium communicatively coupled to the at least one processor and which stores processor-executable instructions which, when executed by the at least one processor, cause the at least one processor to:
  - for a sample digital fingerprint of a physical object to be authenticated,
    - determine a respective at least one non-positional characterization value for one or more points of interest represented by the sample digital fingerprint of a physical object to be authenticated;
    - for at least one of the one or more points of interest represented by the sample digital fingerprint of the physical object to be authenticated, compare one or more feature vectors associated with respective ones of the one or more points of interest represented by the sample digital fingerprint with one or more feature vectors associated with one or more points of interest of a plurality of reference digital fingerprints that represent one or more reference physical objects;
    - for each of a number of the one or more points of interest of the plurality of reference digital fingerprints that has a respective feature vector that matches within a first range with at least one of the feature vectors associated with respective ones of the one or more points of interest represented by the sample digital fingerprint, filter the matches based at least in part on the non-positional characterization values; and
    - determine whether the sample digital fingerprint sufficiently matches at least one of the reference digital fingerprint based on both the matching of the feature vectors within the first range and the filtering of the matches based at least in part on the non-positional characterization values within the second range.

Example 25. The system of example 24 wherein to determine a respective at least one non-positional characterization value of one or more points of interest represented by the sample digital fingerprint of the physical object to be authenticated, the processor-executable instructions when executed cause the at least one processor to: determine a respective orientation angle of one or more points of interest represented by the sample digital fingerprint of a physical object to be authenticated.

Example 26. The system of example 25 wherein to determine a respective orientation angle of one or more points of interest represented by the sample digital fingerprint of a physical object to be authenticated, the processor-executable instructions when executed cause the at least one processor to: determine a respective orientation of an image characterization region spatially associated with a respective one of the one or more points of interest represented by the sample digital fingerprint.

Example 27. The system of example 24 wherein to determine a respective at least one non-positional characterization value of one or more points of interest represented by the sample digital fingerprint of the physical object to be authenticated, the processor-executable instructions when executed cause the at least one processor to: determine a respective scale of the one or more points of interest represented by the sample digital fingerprint of a physical object to be authenticated.

Example 28. The system of example 27 wherein to determine a respective scale of the one or more points of interest represented by the sample digital fingerprint of a physical object to be authenticated, the processor-executable instructions when executed cause the at least one processor to: determine a width of a strongest Laplacian or Hessian of an image characterization region spatially associated with a respective one of the one or more points of interest represented by the sample digital fingerprint.

Example 29. The system of example 24 wherein to determine a respective at least one non-positional characterization value of one or more points of interest represented by the sample digital fingerprint of the physical object to be authenticated, the processor-executable instructions when executed cause the at least one processor to: determine a respective filter response of the one or more points of interest represented by the sample digital fingerprint of a physical object to be authenticated.

Example 30. The system of example 29 wherein to determine a respective filter response of the one or more points of interest represented by the sample digital fingerprint of a physical object to be authenticated, the processor-executable instructions when executed cause the at least one processor to: determine an absolute value of a Laplacian or Hessian of an image characterization region spatially associated with a respective one of the one or more points of interest represented by the sample digital fingerprint.

Example 31. The system of example 24 wherein filtering the matches based at least in part on the non-positional characterization values includes determining whether a respective at least one non-positional characterization value for the point of interest of the reference digital fingerprint is within a second range of the respective at least one non-positional characterization value of the point of interest represented by the sample digital fingerprint.

Example 32. The system of example 31 wherein to determine whether a respective at least one non-positional characterization value for the point of interest of the reference digital fingerprint is within a second range of the respective at least one non-positional characterization value of the point of interest represented by the sample digital fingerprint, the processor-executable instructions when executed cause the at least one processor to: i) determine whether a first type of non-positional characterization value for the point of interest of the reference digital fingerprint is within a first specified range of the respective non-positional characterization value of the point of interest represented by the sample digital fingerprint, and then ii) determine whether a second type of non-positional characterization value for the point of interest of the reference digital fingerprint is within a second specified range of the respective non-positional Example 33. The system of any of examples 24 through 32 wherein the processor-executable instructions, when executed, cause the at least one processor further to:
- for each of the one or more points of interest represented by the sample digital fingerprint of the physical object to be authenticated,
  - i) normalize the respective point of interest based on the determined respective at least one non-positional characterization value for the point of interest; and
  - ii) generate the respective feature vector based on the normalized respective point of interest, before the comparison the one or more feature vectors associated with respective ones of the one or more points of interest represented by the sample digital fingerprint with the one or more feature vectors associated with the one or more points of interest of the plurality of reference digital fingerprints.

Example 34. The system of example 33 wherein to normalize the respective point of interest based on the determined respective at least one non-positional characterization value for the point of interest, the processor-executable instructions when executed cause the at least one processor to: normalize an image characterization region spatially associated with a respective one of the one or more points of interest represented by the sample digital fingerprint.

Example 35. The system of example 33 wherein the processor-executable instructions, when executed, cause the at least one processor further to:
generate the sample digital fingerprint of the physical object to be authenticated that encompasses the generated feature vectors for the one or more points of interest and the non-positional characterization values for one or more points of interest represented by the sample digital fingerprint of a physical object to be authenticated.

Example 36. The system of example 31 wherein the processor-executable instructions, when executed, cause the at least one processor further to:
for each of the one or more points of interest of the plurality of reference digital fingerprints that has a respective feature vector that matches within the first range with one of the feature vectors associated with respective ones of the one or more points of interest represented by the sample digital fingerprint, those matching points of interest comprising a matched pair of points of interest, bin a value that represents a difference or a ratio between the at least one non-positional characterization value for the point of interest of the reference digital fingerprint and the at least one non-positional characterization value of the point of interest represented by the sample digital fingerprint of the matched pair of points of interest.

Example 37. The system of example 36 wherein to bin a value, the processor-executable instructions when executed cause the at least one processor to: increment a count in a corresponding bin for each of the matched pair of points of interest having a respective difference or a respective ratio between the at least one of the non-positional characterization values of the matched pair of points of interest that falls within a range of the respective bin.

Example 38. The system of example 36 wherein to bin a value, the processor-executable instructions when executed cause the at least one processor to: increment a count in a corresponding orientation angle bin for each of the matched pair of points of interest having a respective difference in orientation angle that falls within a range of the respective orientation angle bin.

Example 39. The system of example 38 wherein to filter, the processor-executable instructions when executed cause the at least one processor to: filter based on the range of the respective orientation angle bin having the highest count.

Example 40. The system of example 38 wherein to filter, the processor-executable instructions when executed cause the at least one processor to: filter based on the range of the respective orientation angle bin having the highest count and based on the range of at least one orientation angle bin that is successively adjacent to the orientation angle bin having the highest count.

Example 41. The system of example 24 wherein the processor-executable instructions, when executed, cause the at least one processor further to:
in response to a determination that the sample digital fingerprint sufficiently matches at least one of the reference digital fingerprint based on both the matching of the feature vectors within the first range and the matching of non-positional characterization values within the second range provide an indication of a match for the physical object to be authenticated.

Example 42. The system of example 41 wherein to provide an indication of a match for the physical object to be authenticated, the processor-executable instructions when executed cause the at least one processor to: provide an indication of the match that does not identify an identity of either the physical object to be authenticated nor the reference physical object.

Example 43. The system of example 41 wherein the sample digital fingerprint represents a portion of a human, the reference digital fingerprints represent portions of two or more humans, and to provide an indication of a match for the physical object to be authenticated, the processor-executable instructions when executed cause the at least one processor to: provide an indication of the match that does not identify any of the humans.

Example 44. The system of example 24 wherein the processor-executable instructions, when executed, cause the at least one processor further to:
identify one or more points of interest in a digital image, and
for each of the identified points of interest in the digital image, determine a respective image characterization pattern spatially associated with the respective point of interest, and wherein to determine a respective at least one non-positional characterization value for one or more points of interest represented by the sample digital fingerprint of a physical object to be authenticated, the processor-executable instructions, when executed, cause the at least one processor to determine at least one non-positional characterization value for the respective characterization pattern spatially associated with the respective point of interest for the one or more points of interest represented by the digital fingerprint of a physical object to be authenticated.

Example 45. The system of example 24 wherein the processor-executable instructions, when executed, cause the at least one processor further to:
in response determine that the sample digital fingerprint does not sufficiently match at least one of the reference digital fingerprint based on both the matching of the feature vectors within the first range and the filtering of the matches based at least in part on the non-positional characterization values within the second range, provide an indication of a lack of a match for the physical object to be authenticated.

Example 46. A method of authenticating physical objects, comprising:
identifying one or more points of interest in a digital image;
for each of the identified points of interest in the digital image,
determining a respective image characterization pattern spatially associated with the respective point of interest;
determining a respective at least one non-positional characterization value for one or more of the identified points of interests based represented by the sample digital fingerprint of a physical object to be authenticated comprises determining at least one non-positional characterization value of the respective characterization pattern spatially associated with the respective point of interest for the one or more points of interest represented by the digital fingerprint of a physical object to be authenticated;

normalizing the respective point of interest based on the determined respective at least one non-positional characterization value for the point of interest; and generating the respective feature vector based on the normalized the respective point of interest; and generating a digital fingerprint that includes the feature vectors and the non-positional characterization values for each of the points of interest;

storing the generated digital fingerprint to a memory or other nontransitory processor-readable medium.

Example 47. The method of example 46 wherein determining a respective at least one non-positional characterization value of one or more points of interest includes determining one or more non-positional characterization values selected from the group consisting of an orientation angle of the image characterization region spatially associated with the respective point of interest, a scale of the image characterization region spatially associated with the respective point of interest, and a filter response of the image characterization region spatially associated with the respective point of interest.

Example 48. The method of example 47 wherein determining a scale includes determining a width of a strongest Laplacian or Hessian of the image characterization region spatially associated with the respective point of interest.

Example 49. The method of example 47 wherein determining a filter response includes determining an absolute value of a Laplacian or Hessian of the image characterization region spatially associated with the respective more point of interest.

Example 50. The method of example 47 wherein determining one or more non-positional characterization values selected from the group consisting of an orientation angle of the image characterization region spatially associated with the respective point of interest, a scale of the image characterization region spatially associated with the respective point of interest, and a filter response of the image characterization region spatially associated with the respective point of interest includes determining respective non-positional characterization values for a combination of at least two of: i) the orientation angle, ii) the scale or iii) the filter response.

Example 51. The method of any of examples 45 through 50 wherein storing the generated digital fingerprint to a memory or other nontransitory processor-readable medium includes storing the generated digital fingerprint in a datastore to as a reference digital fingerprint.

Example 52. A system to authenticates physical objects, comprising:

at least one processor;

at least one nontransitory processor-readable medium communicatively coupled to the at least one processor and which stores processor-executable instructions which, when executed by the at least one processor, cause the at least one processor to:

identify one or more points of interest in a digital image;

for each of the identified points of interest in the digital image, determine a respective image characterization pattern spatially associated with the respective point of interest;

determine a respective at least one non-positional characterization value for one or more of the identified points of interests based represented by the sample digital fingerprint of a physical object to be authenticated comprises determining at least one non-positional characterization value of the respective characterization pattern spatially associated with the respective point of interest for the one or more points of interest represented by the digital fingerprint of a physical object to be authenticated;

normalize the respective point of interest based on the determined respective at least one non-positional characterization value for the point of interest; and generate the respective feature vector based on the normalized the respective point of interest; and generate a digital fingerprint that includes the feature vectors and the non-positional characterization values for each of the points of interest;

store the generated digital fingerprint to a memory or other nontransitory processor-readable medium.

Example 53. The method of example 52 wherein to determine a respective at least one non-positional characterization value of one or more points of interest, the processor-executable instructions, when executed, cause the at least one processor to store the generated digital fingerprint in a datastore to; determine one or more non-positional characterization values selected from the group consisting of an orientation angle of the image characterization region spatially associated with the respective point of interest, a scale of the image characterization region spatially associated with the respective point of interest, and a filter response of the image characterization region spatially associated with the respective point of interest.

Example 54. The method of example 53 wherein to determine a scale, the processor-executable instructions, when executed, cause the at least one processor to store the generated digital fingerprint in a datastore to: determine a width of a strongest Laplacian or Hessian of the image characterization region spatially associated with the respective point of interest.

Example 55. The method of example 53 wherein to determine a filter response, the processor-executable instructions, when executed, cause the at least one processor to store the generated digital fingerprint in a datastore to: determine an absolute value of a Laplacian or Hessian of the image characterization region spatially associated with the respective more point of interest.

Example 56. The method of example 53 wherein to determine one or more non-positional characterization values selected from the group consisting of an orientation angle of the image characterization region spatially associated with the respective point of interest, a scale of the image characterization region spatially associated with the respective point of interest, and a filter response of the image characterization region spatially associated with the respective point of interest, the processor-executable instructions, when executed, cause the at least one processor to store the generated digital fingerprint in a datastore to: determine respective non-positional characterization values for a combination of at least two of: i) the orientation angle, ii) the scale or iii) the filter response.

Example 57. The of any of examples 52 through 56 wherein to store the generated digital fingerprint to a memory or other nontransitory processor-readable medium, the processor-executable instructions, when executed, cause the at least one processor to store the generated digital fingerprint in a datastore to as a reference digital fingerprint.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet including, but not limited to, U.S. patent application 63/031,533, filed May 28, 2020; and U.S. patent application Ser. No. 17/209,464, filed Mar. 23, 2021, are incorporated herein by reference, in their entirety. Aspects of the embodiments can be modified, if necessary, to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method of authenticating physical objects, comprising:
   for a sample digital fingerprint of a physical object to be authenticated,
      determining a respective at least one non-positional characterization value for one or more points of interest represented by the sample digital fingerprint of a physical object to be authenticated;
      for at least one of the one or more points of interest represented by the sample digital fingerprint of the physical object to be authenticated, comparing one or more feature vectors associated with respective ones of the one or more points of interest represented by the sample digital fingerprint with one or more feature vectors associated with one or more points of interest of a plurality of reference digital fingerprints that represent one or more reference physical objects;
      for each of a number of the one or more points of interest of the plurality of reference digital fingerprints that has a respective feature vector that matches within a first range with at least one of the feature vectors associated with respective ones of the one or more points of interest represented by the sample digital fingerprint, filtering the matches based at least in part on the non-positional characterization values; and
      determining whether the sample digital fingerprint sufficiently matches at least one of the reference digital fingerprints based on both the matching of the feature vectors within the first range and the filtering of the matches based at least in part on the non-positional characterization values within a second range.

2. The method of claim 1 wherein determining a respective at least one non-positional characterization value of one or more points of interest represented by the sample digital fingerprint of the physical object to be authenticated includes determining a respective orientation angle of one or more points of interest represented by the sample digital fingerprint of a physical object to be authenticated.

3. The method of claim 2 wherein determining a respective orientation angle of one or more points of interest represented by the sample digital fingerprint of a physical object to be authenticated includes determining a respective orientation of an image characterization region spatially associated with a respective one of the one or more points of interest represented by the sample digital fingerprint.

4. The method of claim 1 wherein determining a respective at least one non-positional characterization value of one or more points of interest represented by the sample digital fingerprint of the physical object to be authenticated includes determining a respective scale of the one or more points of interest represented by the sample digital fingerprint of a physical object to be authenticated.

5. The method of claim 4 wherein determining a respective scale of the one or more points of interest represented by the sample digital fingerprint of a physical object to be authenticated includes determining a width of a strongest Laplacian or Hessian of an image characterization region spatially associated with a respective one of the one or more points of interest represented by the sample digital fingerprint.

6. The method of claim 1 wherein determining a respective at least one non-positional characterization value of one or more points of interest represented by the sample digital fingerprint of the physical object to be authenticated includes determining a respective filter response of the one or more points of interest represented by the sample digital fingerprint of a physical object to be authenticated.

7. The method of claim 6 wherein determining a respective filter response of the one or more points of interest represented by the sample digital fingerprint of a physical object to be authenticated includes determining an absolute value of a Laplacian or Hessian of an image characterization region spatially associated with a respective one of the one or more points of interest represented by the sample digital fingerprint.

8. The method of claim 1 wherein filtering the matches based at least in part on the non-positional characterization values includes determining whether a respective at least one non-positional characterization value for the point of interest of the reference digital fingerprint is within a second range of the respective at least one non-positional characterization value of the point of interest represented by the sample digital fingerprint.

9. The method of claim 8 wherein determining whether a respective at least one non-positional characterization value for the point of interest of the reference digital fingerprint is within a second range of the respective at least one non-positional characterization value of the point of interest represented by the sample digital fingerprint includes: i) determining whether a first type of non-positional characterization value for the point of interest of the reference digital fingerprint is within a first specified range of the respective non-positional characterization value of the point of interest represented by the sample digital fingerprint, and then ii) determining whether a second type of non-positional characterization value for the point of interest of the reference digital fingerprint is within a second specified range of the respective non-positional values.

10. The method of claim 1, further comprising:
   for each of the one or more points of interest represented by the sample digital fingerprint of the physical object to be authenticated,
      i) normalizing the respective point of interest based on the determined respective at least one non-positional characterization value for the point of interest; and
      ii) generating the respective feature vector based on the normalized respective point of interest;
   before comparing the one or more feature vectors associated with respective ones of the one or more points of interest represented by the sample digital fingerprint with the one or more feature vectors associated with the one or more points of interest of the plurality of reference digital fingerprints.

11. The method of claim 10 wherein normalizing the respective point of interest based on the determined respective at least one non-positional characterization value for the point of interest includes normalizing an image characterization region spatially associated with a respective one of the one or more points of interest represented by the sample digital fingerprint.

12. The method of claim 10, further comprising:
generating the sample digital fingerprint of the physical object to be authenticated that encompasses the generated feature vectors for the one or more points of interest and the non-positional characterization values for one or more points of interest represented by the sample digital fingerprint of a physical object to be authenticated.

13. The method of claim 8, further comprising:
for each of the one or more points of interest of the plurality of reference digital fingerprints that has a respective feature vector that matches within the first range with one of the feature vectors associated with respective ones of the one or more points of interest represented by the sample digital fingerprint, those matching points of interest comprising a matched pair of points of interest, binning a value that represents a difference or a ratio between the at least one non-positional characterization value for the point of interest of the reference digital fingerprint and the at least one non-positional characterization value of the point of interest represented by the sample digital fingerprint of the matched pair of points of interest.

14. The method of claim 13 wherein the binning includes:
incrementing a count in a corresponding bin for each of the matched pair of points of interest having a respective difference or a respective ratio between the at least one of the non-positional characterization values of the matched pair of points of interest that falls within a range of the respective bin.

15. The method of claim 13 wherein the binning includes:
incrementing a count in a corresponding orientation angle bin for each of the matched pair of points of interest having a respective difference in orientation angle that falls within a range of the respective orientation angle bin.

16. The method of claim 15 wherein the filtering is based on the range of the respective orientation angle bin having the highest count.

17. The method of claim 15 wherein the filtering is based on the range of the respective orientation angle bin having the highest count and based on the range of at least one orientation angle bin that is successively adjacent to the orientation angle bin having the highest count.

18. The method of claim 1, further comprising:
in response to determining that the sample digital fingerprint sufficiently matches at least one of the reference digital fingerprints based on both the matching of the feature vectors within the first range and the matching of non-positional characterization values within the second range providing an indication of a match for the physical object to be authenticated.

19. The method of claim 18 wherein providing an indication of a match for the physical object to be authenticated includes: providing an indication of the match that does not identify an identity of either the physical object to be authenticated nor the reference physical object.

20. The method of claim 18 wherein the sample digital fingerprint represents a portion of a human, the reference digital fingerprints represent portions of two or more humans, and providing an indication of a match for the physical object to be authenticated includes:
providing an indication of the match that does not identify any of the humans.

21. The method of claim 1, further comprising:
identifying one or more points of interest in a digital image,
for each of the identified points of interest in the digital image, determining a respective image characterization pattern spatially associated with the respective point of interest, and wherein determining a respective at least one non-positional characterization value for one or more points of interest represented by the sample digital fingerprint of a physical object to be authenticated comprises determining at least one non-positional characterization value of the respective characterization pattern spatially associated with the respective point of interest for the one or more points of interest represented by the digital fingerprint of a physical object to be authenticated.

22. The method of claim 1, further comprising:
in response determining that the sample digital fingerprint does not sufficiently match at least one of the reference digital fingerprint based on both the matching of the feature vectors within the first range and the filtering of the matches based at least in part on the non-positional characterization values within the second range, providing an indication of a lack of a match for the physical object to be authenticated.

23. A system to authenticating physical objects, comprising:
at least one processor;
at least one nontransitory processor-readable medium communicatively coupled to the at least one processor and which stores processor-executable instructions which, when executed by the at least one processor, cause the at least one processor to:
for a sample digital fingerprint of a physical object to be authenticated,
determine a respective at least one non-positional characterization value for one or more points of interest represented by the sample digital fingerprint of a physical object to be authenticated;
for at least one of the one or more points of interest represented by the sample digital fingerprint of the physical object to be authenticated, compare one or more feature vectors associated with respective ones of the one or more points of interest represented by the sample digital fingerprint with one or more feature vectors associated with one or more points of interest of a plurality of reference digital fingerprints that represent one or more reference physical Objects;
for each of a number of the one or more points of interest of the plurality of reference digital fingerprints that has a respective feature vector that matches within a first range with at least one of the feature vectors associated with respective ones of the one or more points of interest represented by the sample digital fingerprint, filter the matches based at least in part on the non-positional characterization values; and
determine whether the sample digital fingerprint sufficiently matches at least one of the reference digital fingerprints based on both the matching of the feature vectors within the first range and the filtering of the matches based at least in part on the non-positional characterization values within a second range.

24. The system of claim 23 wherein to determine a respective at least one non-positional characterization value of one or more points of interest represented by the sample digital fingerprint of the physical object to be authenticated, the processor-executable instructions when executed cause the at least one processor to: determine a respective orientation angle of one or more points of interest represented by the sample digital fingerprint of a physical object to be authenticated.

25. The system of claim 24 wherein to determine a respective orientation angle of one or more points of interest represented by the sample digital fingerprint of a physical object to be authenticated, the processor-executable instructions when executed cause the at least one processor to: determine a respective orientation of an image characterization region spatially, associated with a respective one of the one or more points of interest represented by the sample digital fingerprint.

26. The system of claim 23 wherein to determine a respective at least one non-positional characterization value of one or more points of interest represented by the sample digital fingerprint of the physical object to be authenticated, the processor-executable instructions when executed cause the at least one processor to: determine a respective scale of the one or more points of interest represented by the sample digital fingerprint of a physical object to be authenticated.

27. The system of claim 26 wherein to determine a respective scale of the one or more points of interest represented by the sample digital fingerprint of a physical object to be authenticated, the processor-executable instructions when executed cause the at least one processor to: determine a width of a strongest Laplacian or Hessian of an image characterization region spatially associated with a respective one of the one or more points of interest represented by the sample digital fingerprint.

28. The system of claim 23 wherein to determine a respective at least one non-positional characterization value of one or more points of interest represented by the sample digital fingerprint of the physical object to be authenticated, the processor-executable instructions when executed cause the at least one processor to: determine a respective filter response of the one or more points of interest represented by the sample digital fingerprint of a physical object to be authenticated.

29. The system of claim 28 wherein to determine a respective filter response of the one or more points of interest represented by the sample digital fingerprint, of a physical object to be authenticated, the processor-executable instructions when executed cause the at least one processor to: determine an absolute value of a Laplacian or Hessian of an image characterization region spatially associated with a respective one of the one or more points of interest represented by the sample digital fingerprint.

* * * * *